United States Patent [19]

Arens et al.

[11] Patent Number: 5,667,303
[45] Date of Patent: Sep. 16, 1997

[54] TIME-TEMPERATURE INTEGRATING INDICATOR DEVICE

[75] Inventors: Robert P. Arens, St. Paul; Russell D. Birkholz, Maplewood; Dee Lynn Johnson, Woodbury; Theodore P. Labuza, Arden Hills, all of Minn.; Curtis L. Larson, Hudson, Wis.; David J. Yarusso, Shoreview, Minn.

[73] Assignee: Minnesota Mining and Manufacturing Company, St. Paul, Minn.

[21] Appl. No.: 402,133

[22] Filed: Mar. 10, 1995

[51] Int. Cl.⁶ .................................................. G01K 3/00
[52] U.S. Cl. ........................... 374/102; 374/162; 116/219
[58] Field of Search .............................. 374/100, 102, 374/106, 159, 160, 161, 162; 426/88; 116/217, 218, 219

[56] References Cited

U.S. PATENT DOCUMENTS

| Re. 24,906 | 12/1960 | Ulrich | 206/59 |
|---|---|---|---|
| 2,299,991 | 10/1942 | Kallock | 234/74 |
| 2,379,459 | 7/1945 | Schreiber et al. | 374/106 |
| 2,532,011 | 11/1950 | Dahlquist et al. | 154/53.5 |
| 2,560,537 | 7/1951 | Andersen | 374/106 |
| 3,031,328 | 4/1962 | Larsen | 117/36.7 |
| 3,243,303 | 3/1966 | Johnson | 99/192 |
| 3,331,729 | 7/1967 | Danielson et al. | 161/162 |
| 3,413,168 | 11/1968 | Danielson et al. | 156/71 |
| 3,508,344 | 4/1970 | Thomas | 35/9 |
| 3,954,011 | 5/1976 | Manske | 73/356 |
| 3,962,920 | 6/1976 | Manske | 73/356 |
| 3,967,579 | 7/1976 | Seiter | 115/114.5 |
| 3,981,683 | 9/1976 | Larsson et al. | 23/253 |
| 3,999,946 | 12/1976 | Patel et al. | 23/253 |
| 4,057,029 | 11/1977 | Seiter | 116/114 |
| 4,154,107 | 5/1979 | Giezen et al. | 73/356 |
| 4,280,441 | 7/1981 | McNeely | 116/219 |
| 4,299,880 | 11/1981 | Arens | 428/304 |

(List continued on next page.)

FOREIGN PATENT DOCUMENTS

| 0 454 313 A2 | 10/1991 | European Pat. Off. | G01K 3/04 |
|---|---|---|---|
| 0 623 909 | 11/1994 | European Pat. Off. | G09F 3/02 |
| 647 379 | 12/1950 | United Kingdom | 97/7 |
| WO92/09870 | 6/1992 | WIPO | G01K 3/04 |

OTHER PUBLICATIONS

J.J. Clancy, Microvoid Coatings in Graphic Arts Applications. A Patent Survey in *Ind. Eng. Chem., Prod. Res. Develop.*, vol. 13, No. 1, 1974 (pp. 30–33).

Jerome A. Seiner, Microvoids as Pigments. A Review in *Ind. Eng. Chem., Prod. Res. Develop.*, vol. 17, No. 4, 1978 (pp. 302–317).

John D. Ferry, *Viscoelastic Properties of Polymers*, John Wiley & Sons, 1980 (pp. 1–55).

Robert W. Wherry, Adhesives—Part I; An Introduction in *Naval Stores Review* Mar.–Apr., 1980 (2 pages).

(List continued on next page.)

*Primary Examiner*—G. Bradley Bennett
*Attorney, Agent, or Firm*—Gary L. Griswold; Walter N. Kirn; James J. Trussell

[57] ABSTRACT

A selectively activated time-temperature integrating device for providing a visually observable indication of cumulative thermal exposure, in which a viscoelastic material migrates into a diffusely light-reflective porous matrix at a rate which varies with temperature to progressively change the light transmissivity of the porous matrix and thereby provide the visually observable indication. The viscoelastic material can comprise a pressure sensitive adhesive. The visually observable indication can comprise latent indicia which initially are not visible and become visible, obscurable indicia which initially are visible and become obscured, or a combination of both. Various actuating means for selectively switching the indicator from an unactivated state to an activated state are described. Also disclosed are a method for providing a visually observable indication of cumulative thermal exposure and a method for providing a time and temperature integrating device for providing a visually observable indication of cumulative thermal exposure of an object.

78 Claims, 9 Drawing Sheets

U.S. PATENT DOCUMENTS

| | | | |
|---|---|---|---|
| 4,353,990 | 10/1982 | Manske et al. | 435/287 |
| 4,374,889 | 2/1983 | Arens | 428/207 |
| 4,382,700 | 5/1983 | Youngren | 374/102 |
| 4,408,557 | 10/1983 | Bradley et al. | 116/206 |
| 4,418,098 | 11/1983 | Maistrovich | 427/161 |
| 4,428,321 | 1/1984 | Arens | 116/217 |
| 4,457,252 | 7/1984 | Manske | 116/216 |
| 4,539,256 | 9/1985 | Shipman | 428/315.5 |
| 4,629,330 | 12/1986 | Nichols | 368/89 |
| 4,729,687 | 3/1988 | Arens | 401/198 |
| 4,779,120 | 10/1988 | Haas | 355/40 |
| 4,789,637 | 12/1988 | Preziosi et al. | 436/2 |
| 4,793,717 | 12/1988 | Manske | 374/160 |
| 4,846,095 | 7/1989 | Emslander | 116/206 |
| 4,877,253 | 10/1989 | Arens | 273/240 |
| 4,903,254 | 2/1990 | Haas | 368/327 |
| 4,973,513 | 11/1990 | Riedel | 428/252 |
| 5,045,283 | 9/1991 | Patel | 422/56 |
| 5,053,339 | 10/1991 | Patel | 436/2 |
| 5,057,434 | 10/1991 | Prusik et al. | 436/2 |
| 5,058,088 | 10/1991 | Haas et al. | 368/327 |
| 5,120,137 | 6/1992 | Ou-Yang | 374/106 |
| 5,215,378 | 6/1993 | Manske | 374/105 |
| 5,254,473 | 10/1993 | Patel | 436/1 |
| 5,354,598 | 10/1994 | Arens | 428/195 |
| 5,364,132 | 11/1994 | Haas et al. | 283/67 |
| 5,389,426 | 2/1995 | Arens et al. | 428/195 |
| 5,446,705 | 8/1995 | Haas et al. | 368/327 |

OTHER PUBLICATIONS

Theodore P. Labuza, Ph.D. *Shelf–Life Dating of Foods*, Food & Nutrition Press, Inc., 1982 (pp. 41–87).

P.S. Taoukis, G.A. Reineccius, and T.P. Labuza. Application of Time–Temperature Indicators to Monitor Quality of Flavors Food Products in *Flavors and Off–Flavors '89*, G. Charalambous, ed. Elsevier Science Publishers, 1990 (pp. 385–398).

Petro S. Taoukis, Theodore P. Labuza, and Robert C. Francis. Time–Temperature Indicators as Food Quality Monitors in *Food Pakcaging Technology*, American Society for Testing Materials, ASTM STP 1113, 1991 (pp. 51–63).

Dee Lynn Johnson, Indicating Devices in *The Wiley Encyclopedia of Packaging Technology*, John Wiley & Sons, 1986 (pp. 400–406).

P.S. Taoukis and T.P. Labuza, Applicability of Time–Temperature Indicators as Shelf Life Monitors of Food Products in *Journal of Food Science*, vol. 54, No. 4, 1989 (pp. 783–788).

P.S. Taoukis and T.P. Labuza, Reliability of Time–Temperature Indicators as Food Quality Monitors Under Nonisothermal Conditions in *Journal of Food Science*, vol. 54, No. 4, 1989 (pp. 789–792).

B. Fu, P.S. Taoukis and T.P. Labuza, Theoretical Design of a Variable Activation Energy Time–Temperature Integrator for Prediction of Food or Drug Shelf Life in *Drug Development and Industry Pharmacy*, 18(8), 1992 (pp. 829–850).

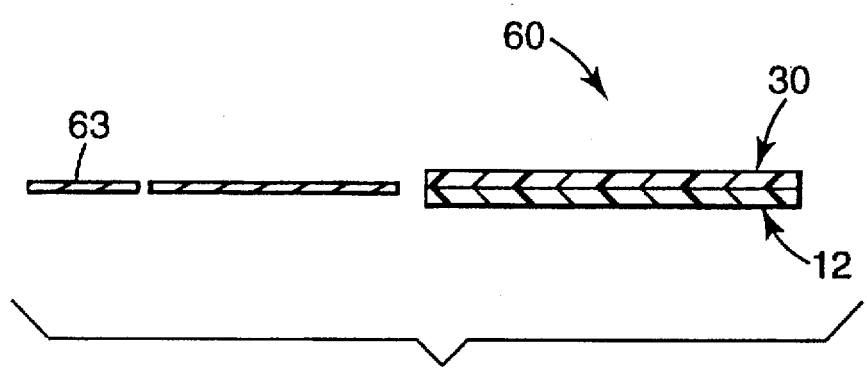
Fig. 5B
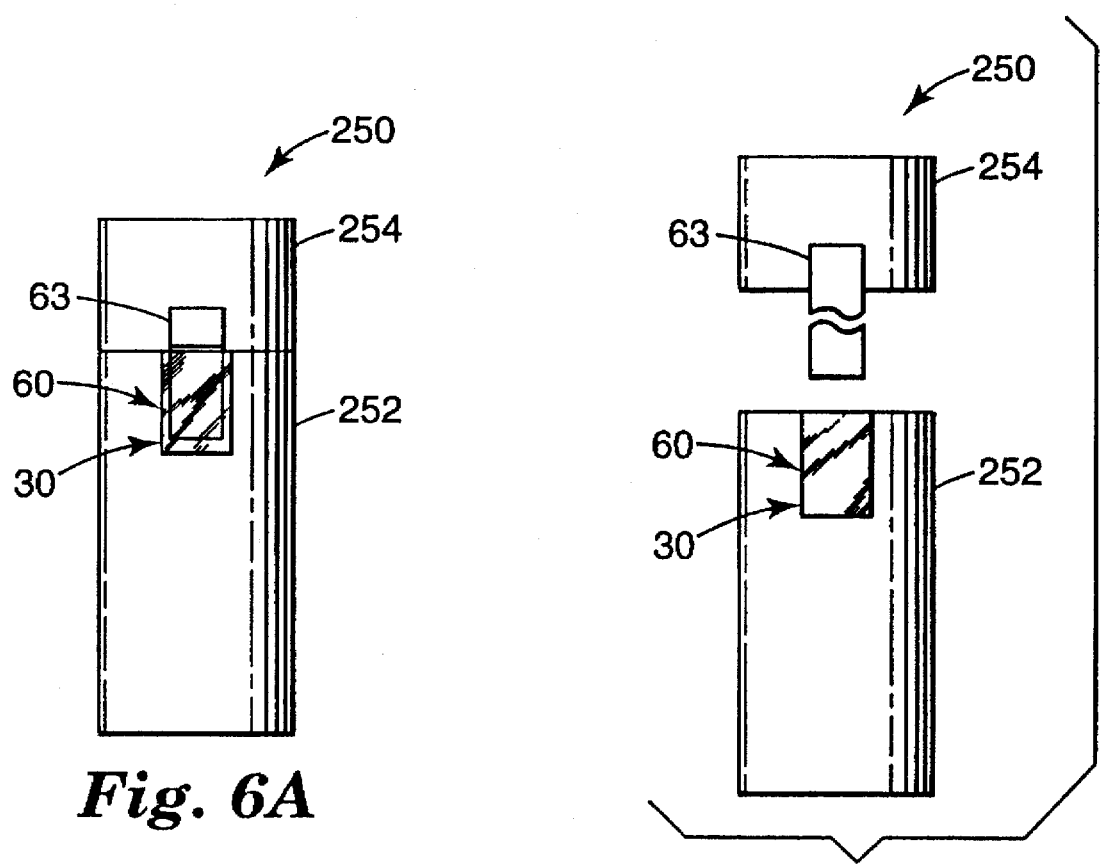
Fig. 6A
Fig. 6B

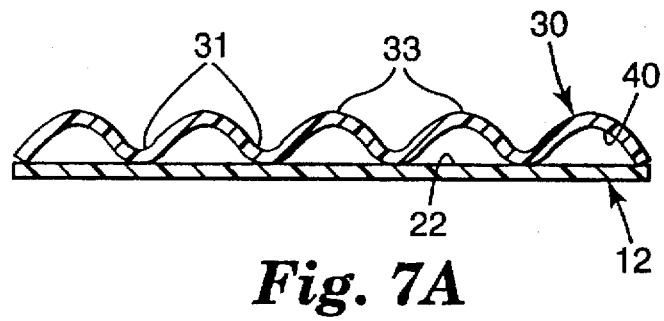
Fig. 7A
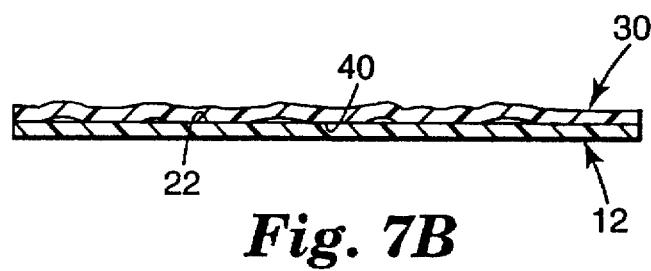
Fig. 7B
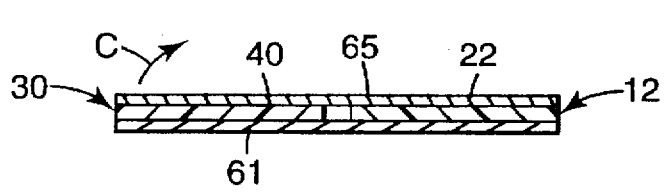 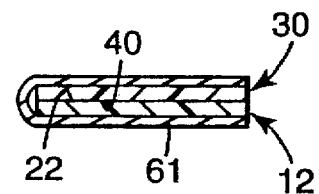
Fig. 8A    Fig. 8B
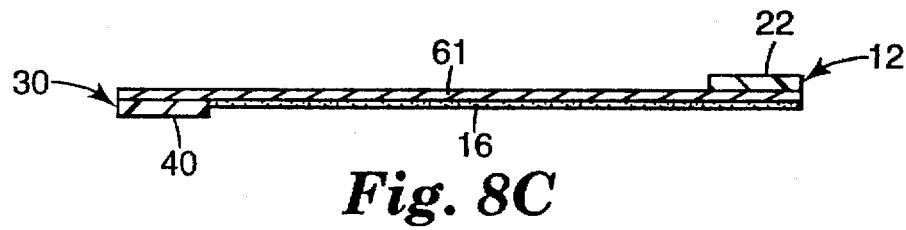
Fig. 8C
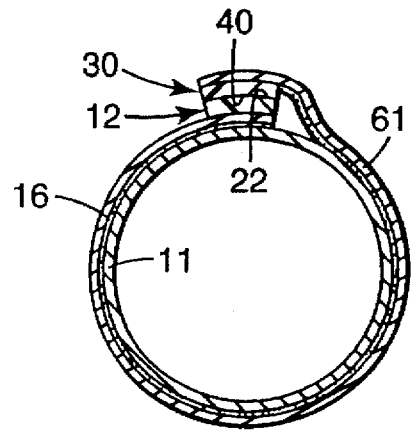
Fig. 8D

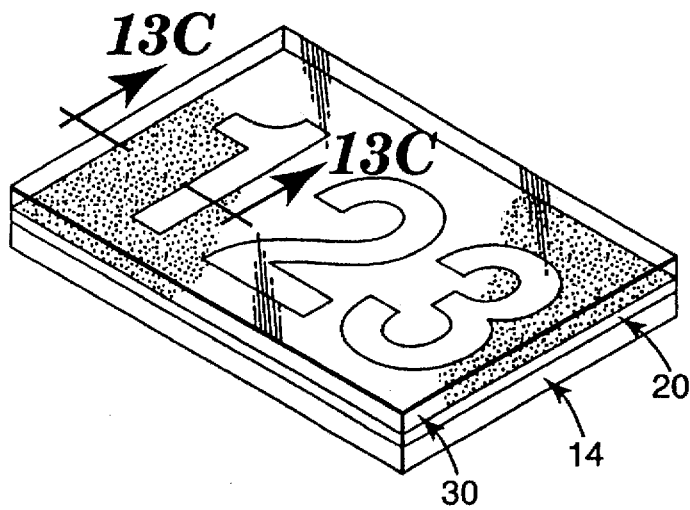
Fig. 13B
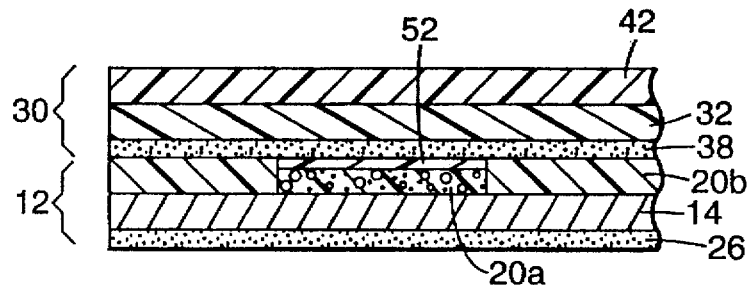
Fig. 13C
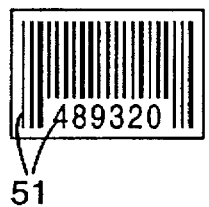  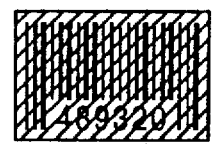
Fig. 14A    Fig. 14B    Fig. 14C
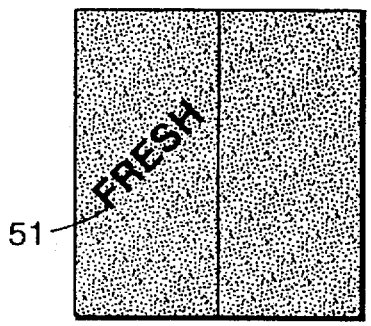 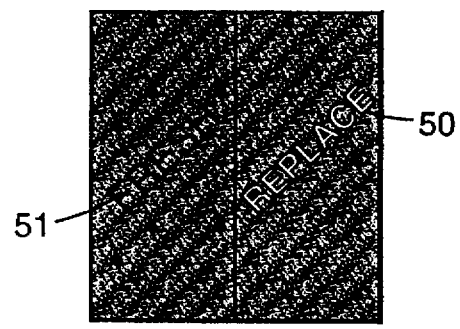
Fig. 15A    Fig. 15B

TIME-TEMPERATURE INTEGRATING INDICATOR DEVICE

TECHNICAL FIELD

The present invention relates to a temperature indicating device, and more particularly a selectively activated time-temperature integrating device for providing a visually observable indication of cumulative thermal exposure, in which a viscoelastic material migrates into a diffusely light-reflective porous matrix at a rate which varies with temperature to progressively change the light transmissivity of the porous matrix and thereby provide the visually observable indication.

BACKGROUND OF THE INVENTION

It is desirable to provide an indication of when the useful life of a perishable product has expired. Such perishable products include, but are not limited to, foods, food additives such as aspartame, biological materials, drugs, cosmetics, photographic supplies, and vaccines. One simple way of providing this indication is to mark each product with a suggested date by which the product should be used. However, there is a shortcoming in this method in that the actual useful life of perishable products is dependent on the temperature history to which the product is exposed because the rate of degradation of a perishable product usually increases with increasing temperature. In other words, a perishable product will generally have a shorter remaining useful life when exposed to a certain period at a relatively high temperature than when exposed to the same period at a relatively low temperature. More broadly, the rate of change of a particular property or characteristic of any material or product may increase with increasing temperature. Therefore, marking a product with a use by date must be based on assumptions about the anticipated cumulative thermal exposure of the particular product. However, the actual exposure cannot always be predicted or controlled. Therefore, there is a need to provide an indication of the useful life of a product taking into account the actual cumulative thermal exposure of the product by integrating the actual temperature exposure over time and providing a visual indication of exposure which equals or exceeds a predetermined allowable cumulative thermal exposure. Such an indicator should be capable of integrating temperature over time for the entire range of temperatures to which the product will be exposed and for the entire range of temperatures at which appreciable change in the product occurs.

Of particular concern is that the rate of degradation or other change at a given temperature is different from product to product, as is the variation in the rate of degradation with temperature. Some products show a greater increase in rate of change for a given temperature increase than other products. One useful way to quantify this is with reference to the $Q_{10}$ of a reaction. The $Q_{10}$ is an indication of how much faster a reaction (such as chemical change, microbial growth, or enzymatic spoilage of a perishable product) occurs in response to a 10° C. increase in temperature:

$$Q_{10} = (\text{Rate of change at T+10° C.})/(\text{Rate of change at T})$$

For example, most perishable foods stored under refrigeration have $Q_{10}$ values based on spoilage by microbial growth which range from about 2 to 10. In other words, the rate of degradation will increase by a factor of from about 2 to 10, depending on the particular food, in response to an increase in temperature of 10° C. Other perishable items such as drugs, biological materials, and vaccines will likewise show different $Q_{10}$ values for each particular item.

The Arrhenius relationship is also a useful tool for quantifying the effect of temperature on many chemical and physical processes. The Arrhenius relationship is:

$$k = k_0 \exp(-Ea/RT)$$

where
 k=the rate constant at temperature T;
 $k_0$=the preexponential factor;
 R=the ideal gas constant; and
 Ea=the activation energy.

It is possible to perform experiments with particular perishable items to determine rates of degradation at various temperatures, and then apply the Arrhenius relationship to these experiments to calculate a measured activation energy (Ea) for each particular perishable item within a given temperature range. It has been observed that for many perishable items, such data will closely fit the Arrhenius equation, which assumes that Ea is independent of temperature. As with the $Q_{10}$ value, the particular value of Ea will vary with the particular item to be monitored. For a further discussion on the analysis and quantification of the degradation of foods, reference is made to Theodore P. Labuza, *Shelf-Life Dating of Foods* 41–87 (Food & Nutrition Press, Inc. 1982).

Therefore, it is seen that there is a need to provide an indicator of cumulative thermal exposure in which the $Q_{10}$ or Ea of the rate of providing a visual indication of cumulative thermal exposure can be approximately matched to the $Q_{10}$ or Ea of the change of the object to be monitored. The indication of cumulative thermal exposure can thereby be approximately matched to the cumulative degradation of the object to be monitored.

It is also desirable to provide a time temperature indicator which has an unactivated state in which it may be stored at varying temperatures for long periods of time without changing. While it may be desirable to activate the indicator while it is being fabricated, the indicator also should be capable of selectively being switched to an activated state before, after, or at the time it is affixed to an object to be monitored, after a container is filed with contents to be monitored, after opening a container of contents to be monitored, or at any other desired time after the indicator is fabricated. Such an indicator, whether activated or unactivated, should not be deleteriously affected by environmental factors such as humidity and light.

Time and temperature indicators which visually indicate temperature exposure are known. For a discussion of several types of indicators, reference is made to Dee Lynn Johnson, *Indicating Devices*, in *The Wiley Encyclopedia of Packaging Technology*, 400–406 (John Wiley & Sons, 1986).

A time-temperature indicator which operates on diffusion properties and provides a visual indication by means of a chemical reaction is disclosed in U.S. Pat. No. 5,053,339, entitled "Color Changing Device for Monitoring Shelf-Life of a Perishable Product," issued to Patel (the '339 patent). The '339 patent discloses a color changing device for monitoring the time-temperature history of perishable products containing an activator tape and an indicating tape. The activator tape contains an activator composition matrix which includes an activating composition such as an organic acid. The indicating tape includes an indicating composition matrix which includes an indicating composition such as an acid-base dye indicator. One or both of the matrices is a pressure sensitive adhesive. The indicator produces a color change as the activating composition diffuses out of the activator matrix and into the indicator matrix and chemically reacts with the indicating composition in the indicating matrix. The color intensifies with time and temperature as more activator composition diffuses into the indicator matrix and reacts. Abstract, lines 1–17. Because the indicator disclosed in the '339 patent produces a color change based on pH, its operation is susceptible to changes in ambient moisture.

Another type of indicator is disclosed in U.S. Pat. No. 3,954,011, entitled "Selected Time Interval Indicating Device," issued to Manske (the '011 patent). The '011 patent discloses an indicator including a porous fluid carrying pad, a saturant material, a wick material for the saturant, and an indicator means whereby the progress of the saturant from the porous carrying pad along the wick material can be visibly indicated and used to measure the passage of time, the exposure to a given minimum temperature, or a time-temperature relationship. Abstract, lines 1–9. When the saturant is chosen so as to be in a liquid state at the intended storage temperature, the indicator indicates the passage of a time interval as the liquid progresses along the wick. Column 5, lines 12–21. The saturant may instead be selected so as to be solid at desired storage temperatures at which frozen foods are stored and to become liquid at temperatures at which the food is thawed. The saturant will remain solid while the indicator is at the desired storage temperature. The saturant will melt to a penetrating state and then progress along the wick while the indicator is above the predetermined temperature, thereby indicating the passage of time above the predetermined temperature. Column 5, lines 22–44. A plurality of saturant materials having varying freezing points, each having its own wicking path, can be used to indicate time of exposure to discrete predetermined temperature ranges. Column 5, line 45 through column 6, line 5. Such an indicator, however, is not able to record passage of time below the melt temperature of the saturant.

Another indicator is disclosed in U.S. Pat. No. 4,428,321, entitled "Thermally-Activated Time-Temperature Indicator," issued to Arens (the '321 patent). The '321 patent discloses a device which provides a visual indication that permissible time within a predetermined temperature range has been exceeded. Column 2, lines 912. The device includes an opaque microporous sheet with a colored stratum on its back and a transparent fusible coating bonded to its face. The fusible coating is a solid solution of an amorphous rubbery polymer dissolved in a crystallizable solvent such as wax. The solvent has a melting point below the lower end of the predetermined temperature range and the polymer has a glass transition temperature below the lower end of the predetermined temperature range. The solid solution does not appreciably penetrate the microporous coating. Column 2, lines 20–37. Below the melting temperature of the solvent, the composition is a non-penetrating solid. When the indicator is heated to a predetermined temperature, the solid wax solvent melts and dissolves the rubbery polymer, resulting in a liquid penetrating state which gradually penetrates the microporous layer. Column 2, lines 59–64; column 3, lines 23–28. Since the refractive index of the polymer and wax composition is essentially the same as that of the solid component of the microporous layer, the microporous layer gradually becomes transparent. Column 2, lines 64–67. The indicator disclosed in the '321 patent cannot indicate cumulative thermal exposure below the melting point of the wax solvent component of the coating. Furthermore, the '321 patent does not suggest applying the fusible coating to a backing for subsequent application to the porous coating, nor any other means for selectively maintaining the fusible coating out of contact with the microporous coating. Therefore, the indicator of the '321 patent must be stored below the melt temperature of the wax prior to use of the indicator.

There is no suggestion, however, to provide a time-temperature integrating device for providing a visually observable indication of cumulative thermal exposure, in which a viscoelastic material migrates into a diffusely light-reflective porous matrix at a rate which varies with temperature and which may be selectively switched from an unactivated state to an activated state over a wide range of temperatures.

SUMMARY OF THE INVENTION

In one aspect of the present invention, a time and temperature integrating device for providing a visually observable indication of cumulative thermal exposure is provided, said device comprising:

a) a first substrate comprising a first side and a second side, said second side including a diffusely light-reflective porous matrix, wherein said porous matrix includes an exposed surface opposite said substrate;

b) a first backing comprising a first surface and a second surface, wherein said first surface of said backing includes a viscoelastic material disposed thereon, and wherein said viscoelastic material includes an exposed surface opposite said backing; and c) actuating means for selectively switching said device from an unactivated state to an activated state;

wherein when said device is in said unactivated state, said viscoelastic material is substantially out of contact with said porous matrix;

wherein when said device is in said activated state, said actuating means maintains said exposed surface of said viscoelastic material and said exposed surface of said porous matrix in substantial contact with one another such that said viscoelastic material progressively migrates into said porous matrix at a rate which increases with increasing temperature; and wherein migration of said viscoelastic material into said porous matrix progressively increases the light transmissivity of said porous matrix to provide said visually observable indication of cumulative thermal exposure.

In another aspect of the present invention, migration of said viscoelastic material into said porous matrix progressively decreases the light transmissivity of said porous matrix to provide said visually observable indication of cumulative thermal exposure.

In another other aspect of the present invention, the viscoelastic material comprises a pressure sensitive adhesive.

In another aspect of the present invention, the visually observable indication comprises latent indicia, wherein said latent indicia is not visually observable when said indicator is in its unactivated state, and wherein migration of said viscoelastic material into said porous matrix sufficiently increases the light transmissivity of said porous matrix such that said latent indicia becomes visually observable.

In another aspect of the present invention, the visually observable indication comprises obscurable indicia, wherein said second surface of said substrate comprises a color and optical density sufficiently similar to the color and optical density of said obscurable indicia such that migration of said viscoelastic material into said porous matrix sufficiently increases the light transmissivity of said porous matrix such that said second surface of said substrate becomes progressively visible through said porous matrix and thereby progressively reduces the contrast between said obscurable indicia and said substrate to thereby obscure said obscurable indicia.

Another aspect of the present invention provides a method for providing a time and temperature integrating device for providing a visually observable indication of cumulative thermal exposure of an object, comprising the steps of: a) mounting a first substrate onto the object, said substrate comprising a first side and a second side, said second side including a diffusely light-reflective porous matrix; and b) contacting a first surface of a first backing against said porous matrix, wherein said first surface of said backing includes a viscoelastic material disposed thereon; wherein said viscoelastic material progressively migrates into said porous matrix at a rate which increases with increasing temperature; and wherein migration of said viscoelastic material into said porous matrix progressively changes the light transmissivity of said porous matrix to provide said visually observable indication.

Another aspect of the present invention provides a method for providing a visually observable indication of cumulative thermal exposure, comprising the steps of: a) applying a viscoelastic liquid onto an exposed surface of a diffusely light-reflective porous matrix; wherein said viscoelastic liquid progressively migrates into said porous matrix at a rate which increases with increasing temperature; b) exposing said viscoelastic liquid to a time and temperature profile; and c) migrating said viscoelastic liquid into said porous matrix in response to said time and temperature profile to thereby change the light transmissivity of said porous matrix to provide a visually observable indication of cumulative thermal exposure.

Another aspect of the present invention provides a method for providing a visually observable indication of cumulative thermal exposure of an object, comprising the steps of: a) mounting a first substrate onto the object, said substrate comprising a first side and a second side, said second side including a diffusely light-reflective porous matrix; b) contacting a first surface of a first backing against said porous matrix, wherein said first surface of said backing includes a viscoelastic material disposed thereon, wherein said viscoelastic material progressively migrates into said porous matrix at a rate which increases with increasing temperature; c) exposing said object to a time and temperature profile; and d) migrating said viscoelastic material into said porous matrix in response to said time and temperature profile to thereby change the light transmissivity of said porous matrix to provide a visually observable indication of cumulative thermal exposure.

Another aspect of the present invention provides a method for providing a time and temperature integrating device for providing a visually observable indication of cumulative thermal exposure, comprising the steps of: a) forming a spacer by forming an opening in a generally planar spacer material, said spacer comprising a top side and a bottom side; b) applying an adhesive to at least said bottom side of the spacer; c) adhering a first substrate onto said bottom side of the spacer to at least partially overlay said opening, said first substrate comprising a diffusely light-reflective porous matrix overlaying said opening; and d) applying a first surface of a first backing to said top side of said spacer to at least partially overlay said opening and said porous matrix, said first backing comprising a viscoelastic material overlaying said opening; whereupon activating said indicator by contacting said viscoelastic material and said porous matrix to one another through said opening, said viscoelastic material progressively migrates into said porous matrix at a rate which increases with increasing temperature; wherein migration of said viscoelastic material into said porous matrix progressively changes the light transmissivity of said porous matrix to provide said visually observable indication.

BRIEF DESCRIPTION OF THE DRAWINGS

The present invention will be further explained with reference to the appended Figures, wherein like structure is referred to by like numerals throughout the several views, and wherein:

FIG. 5B is a view of the indicator of FIG. 5A in its activated state;

FIG. 6A is a view of a further embodiment of a time-temperature integrating indicator constructed in accordance with the present invention in its unactivated state, in combination with a container having a body and a cap;

FIG. 6B is a view of the indicator of FIG. 6A in its activated state;

FIG. 7A is a cross-sectional view of a further embodiment of a time-temperature integrating indicator constructed in accordance with the present invention in its unactivated state;

FIG. 7B is a view of the indicator of FIG. 7A in its activated state;

FIG. 8A is a cross-sectional view of a further embodiment of a time-temperature integrating indicator constructed in accordance with the present invention in its unactivated state;

FIG. 8B is a view of the indicator of FIG. 8A in its activated state;

FIG. 8C is a cross-sectional view of a further embodiment of a time-temperature integrating indicator constructed in accordance with the present invention in its unactivated state;

FIG. 8D is a view of the indicator of FIG. 8C in its activated state;

FIG. 13B is an isometric view like FIG. 13A, including the second laminate portion of the present invention and illustrating the latent indicia which has become visually observable;

FIG. 13C is a cross sectional view of the indicator of FIG. 13B taken along line 13C—13C.

FIG. 14A is a plan view of an indicator including obscurable indicia;

FIG. 14B is a view of the indicator of FIG. 14A, in which the obscurable indicia has become obscured;

FIG. 14C is a view of an alternate embodiment of the indicator of FIG. 14B;

FIG. 15A is a plan view of an indicator comprising obscurable indicia and latent indicia, in which the obscurable indicia is still visually observable and the latent indicia is not yet visually observable;

FIG. 15B is a plan view of the indicator of FIG. 15A, in which the latent indicia has become visually observable and the obscurable indicia has become obscured;

DETAILED DESCRIPTION OF THE INVENTION

Figure 1A:
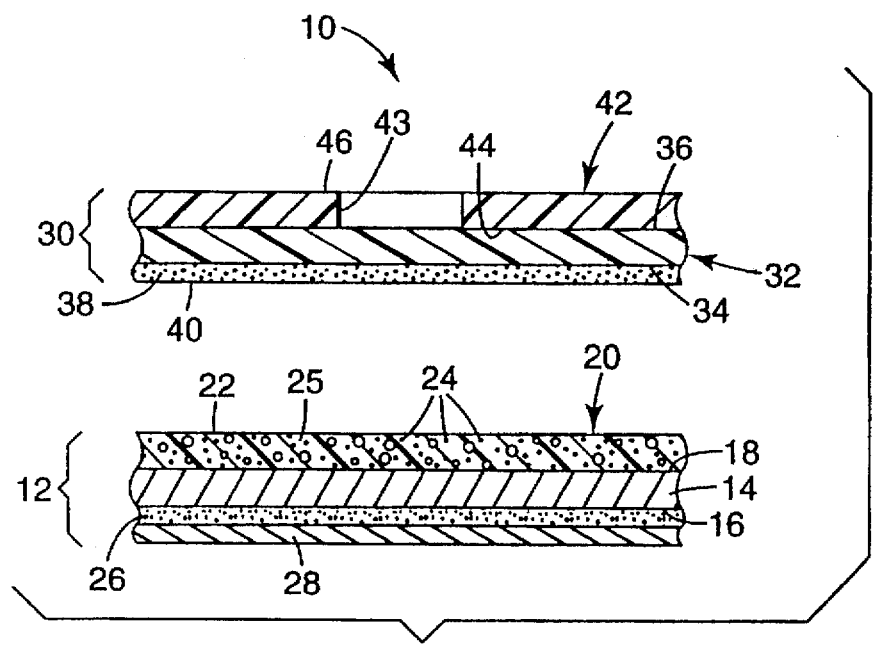
FIG. 1A is a cross sectional view of a first embodiment of a time-temperature integrating indicator constructed in accordance with the present invention, in its unactivated state.
Figure 1B:
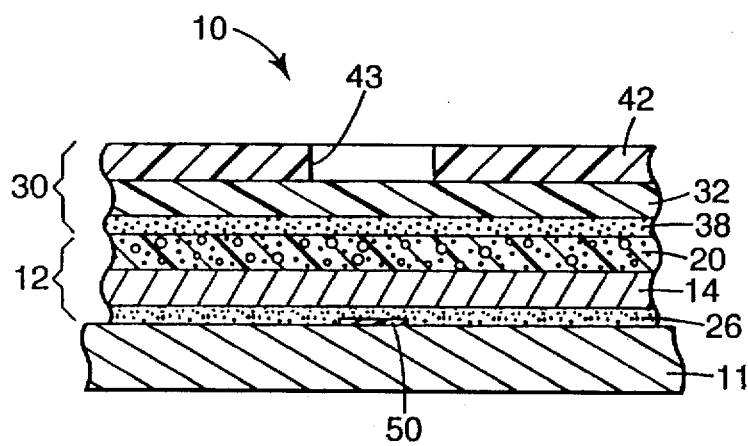
FIG. 1B is a cross sectional view of the indicator of FIG. 1A in its activated state.

A first embodiment of a time-temperature indicating device 10 according to the present invention is illustrated in FIGS. 1A and 1B. The indicator includes a first laminate 12 and a second laminate 30 which are out of contact with one another when the indicator 10 is in an unactivated state as illustrated in FIG. 1A.

First laminate 12 includes a generally planar substrate 14 having a first side 16 and second side 18. A porous matrix 20 is provided on the second side 18 of the substrate. In a preferred embodiment, the porous matrix comprises a plurality of particles 24 held together in an open pore fashion by a binder 25. The porous matrix 20 includes an exposed surface 22 opposite the second side 18 of the substrate. The first laminate 12 optionally includes a means for mounting the indicator 10 to an object 11 whose cumulative thermal exposure is to be indicated. One possible mounting means is illustrated as adhesive layer 26 provided on the first side 16 of the substrate, and a release liner 28 removably adhered to the adhesive layer. The adhesive layer 26 can be, for example, a pressure sensitive adhesive as is known in the art. The indicator of the present invention can instead be affixed to the object to be monitored by any other suitable means. Affixing the indicator directly to the object 11 to be monitored ensures that the indicator is exposed to the same time-temperature history as the object to be monitored. Many other variations are contemplated. Preferably, when the indicator is intended to monitor the cumulative thermal exposure of an object, the indicator is operatively thermally connected to the object or is exposed to the same temperature history as the object.

The porous matrix 20 on substrate 14 can be any suitable microporous, diffusely light-reflective layer which can be made increasingly translucent or transparent by filling its voids with a material having an index of refraction close to that of the matrix. The porous matrix is preferably opaque, or nearly so, prior to filling its voids with an appropriate transparentizing material. Known microporous layers include, but are not limited to, nonwoven substrates, microporous polymeric films, and those opaque microporous layers shown in U.S. Pat. Nos. 2,299,991; 3,031,328; and 3,508,344. In a first preferred embodiment, substrate 14 and porous matrix 20 of first laminate 12 are preferably made in accordance with the teachings of U.S. Pat. No. 4,299,880, entitled "Demand and Timed Renewing Imaging Media," (Arens), the entire disclosure of which is incorporated herein by reference.

In the first preferred embodiment, the substrate 14 may comprise, for example, classes of materials such as polymeric films, paper, and metal foils, including but not limited to acrylic coated aluminum, glass, cellulose, cellulose esters, polycarbonate, nylon, PETG, glassine, grease-proof paper, biaxially oriented polypropylene, or biaxially oriented polyethylene terephthalate. A preferred substrate 14 comprises a 40 pound kraft paper substrate printed or coated with any suitable color and color density chosen for the particular application, laminated to a polyethylene film backing. A second paper is preferably laminated to the second side of the polyethylene film to help maintain a flat substrate 14 during processing. A black substrate has been found to be advantageous for several applications, including where the visually observable indication comprises a laser readable UPC bar code.

In the first preferred embodiment, porous matrix 20 comprises a plurality of particles 24 in a binder 25. Particles 24 can comprise, for example, aluminum oxide, hydrated aluminum oxide, glass, silica, silane-treated silica, silicon dioxide, rice starch, titanium dioxide, zinc oxide, calcium fluoride, or calcium carbonate. Preferred particles include calcium carbonate, silicon dioxide, and calcium fluoride. The diameter of the particles can be in the range of 0.01 to 750 micrometers, preferably in the range of about 0.5 to 40 micrometers, and more preferably approximately 8 micrometers.

The binder 25 of the first preferred embodiment can comprise a polymeric binder, for example, including acrylic, epoxy, polyurethane, or thermoset alkyd. A preferred binder comprises a cured acrylic resin. In order to ensure the presence of microvoids in the layer, the binder to particle volume ratio is selected so that the particles are held in a pseudo-sintered juxtaposition. This effect is obtained by employing a binder to particle volume ratio in the range of about 1:20 to 2:3, preferably about 1:5 to 1:2. Generally, a relatively low binder to particle volume ratio is employed when most of the particles are of relatively large size; correspondingly, a relatively high ratio is employed when most of the particles are of relatively small size.

The particles 24 should have an index of refraction preferably in the range of about 1.3 to 2.2, more preferably in the range of about 1.4 to 1.8, and still more preferably a single index of refraction of about 1.5. The binder 25 preferably has an index of refraction in the same range as the particles 24, for example within 0.4 of the index of refraction of the particles, and more preferably substantially the same as that of the particles 24.

A second preferred embodiment of porous matrix 20 comprises a microporous polymeric film. Suitable films include Teslin™ microporous film (available from PPG Industries, Inc.) and Empore™ particle-filled Teflon microporous film (available from Minnesota Mining and Manufacturing Company, St. Paul, Minn.). Preferred microporous films include those described in U.S. Pat. No. 4,539,256, "Microporous Sheet Material, Method of Making and Articles Made Therewith," (Shipman), the entire disclosure of which is incorporated herein by reference. Particularly preferred are the polyethylene microporous films described in Examples 23 and 24 of Shipman which have been washed to remove any oils that may be present from the manufacturing process. The microporous film is preferably laminated to substrate 14 as described above for convenience of mounting on object 11, although the microporous film can be used without substrate 14.

Second laminate 30 includes a generally planar light transmissive backing 32 having a first surface 34 and a second surface 36. By light transmissive, it is meant that the backing 32 is sufficiently light transmissive or translucent to allow a user of the indicator 10 to visually observe the indication of cumulative thermal exposure through the backing 32. The backing 32 may preferably be translucent, transparent, or nearly transparent. A layer of light transmissive viscoelastic material 38 is provided on the first surface 34 of the backing 32. The first surface 34 can be treated to enhance adhesion of the viscoelastic material 38, such treatments are known in the art and can comprise corona discharge treatment, for example, when the viscoelastic material 38 comprises a pressure sensitive adhesive. The layer of viscoelastic material 38 has an exposed surface 40 opposite the first surface 34 of the backing. The second laminate 30 can optionally include a second light transmissive backing 42 having a first surface 44 and second surface 46. The second backing 42 is disposed on the second surface 36 of first backing by means of a pressure sensitive adhesive, or thermal lamination with a heat activated adhesive, for example. The first backing 32, or the second backing 42, if present, can have a release coating on its exposed surface to allow the second laminate 30 to be wound upon itself without a release liner such that the exposed surface 40 rests on the release coating on the exposed surface of the backing. Preferred types of release coatings are the siloxane and acrylate based compounds disclosed in U.S. Pat. No. 4,973,513 issued to Riedel, and the water-insoluble hydrophobic urethane (carbamate) copolymer of polyvinyl alcohol and octadecyl isocyanate disclosed in U.S. Pat. No. 2,532,011 issued to Dahlquist et al., both assigned to the Minnesota Mining and Manufacturing Company of St. Paul, Minn.

First light transmissive backing 32 can comprise any suitable substrate such as glass, cellophane or film, and preferably comprises a polymeric film, for example, a transparent film of biaxially oriented polyethylene terphthalate or biaxially oriented polypropylene. Backing 32 may comprise a sorer film such as low density polyethylene when flexibility or conformance to a contour is desired. The backing may be of any suitable thickness, and thicknesses of from 12.7 to 50.8 micrometers (0.0005 to 0.002 inches) have been found to have utility, although thicker or thinner backings may be used. Optional second backing 42 may comprise any suitable material and construction, including any of those described with reference to the first backing.

The light transmissive backings can be treated to enhance coating of the adhesive and/or the release coating. Treatments include those common in the industry including chemical priming, flame treatment, and corona treatment. Corona treatment is particularly useful since it can provide increased adhesion of the coating to the backing, and commercial equipment for corona treating is readily available.

The indicator 10 is illustrated in its activated state in FIG. 1B. To activate the indicator 10, the exposed surface 40 of the viscoelastic material 38 and the exposed surface 22 of the porous matrix 20 are brought into contact with each other and maintained in contact. With reference to the exposed surface 22 and exposed surface 44, the term "exposed" is used herein to mean that the exposed surfaces 22 and 40 can come into operative contact with one another when the indicator is in its activated state. However, the exposed surfaces 22 and 40 may or may not be covered when the indicator is in its unactivated state. In one preferred embodiment, the viscoelastic material 38 comprises a pressure sensitive adhesive, which thereby maintains the viscoelastic material 38 and porous matrix 20 in contact with one another. It is also possible to employ second backing 42 larger than first backing 32 and which comprises an adhesive to adhere the second laminate 30 to first laminate 12 and/or to object 11, thereby maintaining the viscoelastic material 38 and porous matrix 20 in contact with one another. Second backing 42 may comprise a label to be applied to object 11, such as a container, in such a way so as to mount the indicator 10 between the outer surface of the container and the first surface 44 of backing 42. Second backing 42 can include an opening 43 therethrough of appropriate size and configuration to allow a user to view the indicator 10 through the backing 42 if backing 42 is opaque as may be the case when backing 42 comprises a paper label, for example.

When the indicator 10 is in its activated state, the viscoelastic material migrates into the porous matrix. Without desiring to be bound by any particular theory, it is believed that capillary action may be the primary mechanism which causes migration of the viscoelastic material into the porous matrix. However other factors, such as the affinity of the viscoelastic material and the porous matrix for one another, viscoelastic flow, pressure, and gravity, may also, or instead, cause migration. The rate of migration increases with increasing temperature. This temperature-dependent rate of migration provides the integration of time and temperature by the indicator 10.

The porous matrix 20 is initially opaque, or nearly so, because it is diffusely-reflective when its voids are filled with a material which has an index of refraction sufficiently different from the indices of refraction of the particles 24 and binder 25 to cause the opacity. Typically, the voids are initially filled with air, but may be filled with any material which imparts the desired degree of opacity to the porous matrix 20. When the viscoelastic material 38 progressively migrates into the porous matrix 20, it gradually fills the voids of the matrix 20, thereby displacing air from the voids. The viscoelastic material 38 and the components of the matrix 20 are chosen to have sufficiently similar indices of refraction such that the matrix 20 becomes increasingly light transmissive as the viscoelastic material 38 fills the voids of the matrix 20. If the indices of refraction of the particles 24, binder 25, and viscoelastic material 38 are sufficiently similar, the matrix 20 can become substantially transparent as the viscoelastic material 38 fills the porous matrix 20. The increasing light transmissivity of the porous matrix 20 as the viscoelastic material 38 migrates into the matrix provides a visually observable indication of cumulative thermal exposure. This effect is described in greater detail below.

Viscoelastic material 38 can comprise any suitable viscoelastic material which provides the desired properties for migration into the porous matrix 20 in response to cumulative thermal exposure, and which has an index of refraction preferably in the same range as the particles 24 and binder 25. The viscoelastic material 38 has an index of refraction preferably within 0.4 of the indices of refraction of the components of the porous matrix 20, and more preferably an index of refraction substantially the same as the components of the porous matrix. For capillary action to drive the migration of the viscoelastic material 38 into the porous matrix 20, the surface energies of the system components cause the local contact angle of the viscoelastic material 38 on the surface of the porous matrix 20 material to be less than 90°. The contact angle is a function of the surface energy of the porous matrix 20, the surface energy of the viscoelastic material 38, and the interfacial energy between the two.

A viscoelastic material is one which exhibits elastic and viscous properties simultaneously. Elastic properties can be explained with reference to classic elastic solids. Elastic solids respond to external stress by deforming, and upon removal of the stress, respond by returning to their original shape. Such a response is called elastic. Some elastic materials exhibit a direct proportionality between the stress and the deformation, thereby conforming to what is known as Hooke's Law. There are also elastic materials which do not obey Hooke's Law and which exhibit a non-linear relationship between stress and deformation. Viscous properties can be explained with respect to classic viscous fluids. If an external stress is applied to a viscous fluid, it will deform and continue to deform as long as the stress is present. Removal of the stress will not result in a return of the fluid to its undeformed state. Such a response is called viscous. When there is a direct proportionality between the stress and the rate of deformation in a viscous fluid, the fluid is a Newtonian fluid. There are also viscous fluids which are non-Newtonian and which exhibit a non-linear dependence between the stress and the rate of deformation. Materials which exhibit both elastic and viscous properties are called viscoelastic materials. Viscoelastic materials are sometimes classified as either viscoelastic solids, i.e., elastic solids which exhibit some viscous effects during deformation, or viscoelastic liquids, i.e., viscous liquids which exhibit some elastic effects. A viscoelastic liquid can be identified as a viscoelastic material which continues to deform indefinitely when subjected to a shearing stress. A viscoelastic material may exhibit a transition from an immobile, glassy state to a viscoelastic liquid state at a temperature known as the glass transition temperature, $T_g$. It may also exhibit a transition from a partially crystalline state to an amorphous state at the temperature at which the crystalline material melts, $T_m$. Often, such a material will behave as a viscoelastic solid below $T_m$. A viscoelastic material may also be chemically crosslinked, rendering it a viscoelastic solid. It may also be physically crosslinked by the presence of crystalline or glassy dispersed phases which are chemically coupled to the matrix phase. It may also exhibit viscoelastic solid properties because of the presence of ionic bonding or hydrogen bonding between polymer molecules. For a further discussion of the properties and analysis of viscoelastic materials, reference is made to John D. Ferry, *Viscoelastic Properties of Polymers* (John Wiley & Sons, Inc. 1980).

In the indicator device of the present invention, the viscoelastic material is preferably in a viscoelastic liquid state at all anticipated temperatures to which the object to be monitored will be exposed. This can be accomplished by choosing a viscoelastic material which has all such thermal transitions at temperatures below the anticipated range of temperatures to which the object to be monitored will be exposed. This allows for an indicator which will be in its activated state upon contacting the viscoelastic material with the porous matrix. This also allows the viscoelastic material to migrate into the matrix throughout the entire anticipated temperature range. In this manner, the indicator will be able to provide continuous integration of time-temperature exposure over the entire range of temperatures to which the object to be monitored is exposed. It is also preferable that the viscoelastic material be in its viscoelastic liquid state, and therefore be able to migrate into the porous matrix, at any temperature at which appreciable degradation or other change can occur in the product being monitored.

Although viscoelastic liquid materials are preferred in the present invention, it is possible for some viscoelastic solid materials to function provided the modulus of the material is low enough for it to deform and penetrate entirely through the porous matrix under the influence of capillary action or other driving forces present in the device.

It is also preferable that the viscoelastic material be a pressure sensitive adhesive at the conditions of activating the indicator so as to provide adhesion to the porous matrix. A pressure sensitive adhesive, or other viscoelastic, material below its $T_g$ or $T_m$ at the time of activation would not be expected to provide initial adhesion.

A viscoelastic solid with a crystalline or glassy continuous phase would not perceptively migrate into the matrix, or if it did, it would be at such a slow rate as to not be practical for providing a visual indication of cumulative thermal exposure. Therefore, a viscoelastic material which has a crystalline or glassy continuous phase in the anticipated temperature range would not be able to provide an integration of temperature throughout the entire range of temperature to which the object to be monitored is exposed. If the viscoelastic material is in its glassy or crystalline state when the viscoelastic material 38 is brought into contact with the porous matrix 20, the indicator would not be effectively activated at that time because effective migration could not begin at that time. The indicator would not be effectively activated until the viscoelastic material was above its $T_g$ or $T_m$. For certain applications, a viscoelastic material which becomes flowable above a threshold temperature may be desirable. However, if the transition occurs at a temperature which is within the temperature range in which appreciable degradation of the product can occur, then the indicator may fail to provide an accurate integration of cumulative thermal exposure, despite the product potentially spending periods of time at temperature allowing degradation.

An illustrative, but by no means exclusive, list of viscoelastic materials which may be suitable for use with the indicator of the present invention includes natural rubber, butyl rubber, polybutadiene and its copolymers with acrylonitrile and styrene, poly alpha olefins such as polyhexene, polyoctene, and copolymers of these and others, polyacrylates, polychloroprene, silicone pressure sensitive adhesives, and block copolymers such as styrene-isoprene block copolymers, and mixtures of any of the above. Viscoelastic material 38 preferably comprises a pressure sensitive adhesive. The pressure sensitive adhesive can comprise, for example, a polyisoprene, atactic polypropylene, polybutadiene, polyisobutylene, silicone, ethylene vinyl acetate, or acrylate based pressure sensitive adhesive, and can typically include a tackifying agent and/or a pasticizing agent. The adhesive is preferably an acrylate based adhesive as described in U.S. Pat. No. Re. 24906, "Pressure-Sensitive Adhesive Sheet Material," (Ulrich), the entire disclosure of which is incorporated herein by reference. Preferred adhesives include isooctyl acrylate (IOA) or isooctyl acrylate/acrylic acid (IOA/AA) based pressure sensitive adhesive. The adhesives of the invention are preferably prepared from pressure sensitive adhesive compositions comprising from about 50 to 100 parts by weight of at least one alkyl acrylate monomer, and correspondingly, from about 50 to 0 parts by weight of an optional reinforcing comonomer. Throughout this application, compositions are described in percentages or ratios by weight, unless indicated otherwise.

Monomers useful in the practice of the invention are those which have a homopolymer glass transition temperature less than about 0° C. Useful alkyl acrylates are unsaturated monofunctional (meth)acrylic acid esters of non-tertiary alkyl alcohols having from 2 to 20 carbon atoms in the alkyl moiety, and preferably from 4 to 18 carbon atoms, and more preferably, from 4 to 12 carbon atoms. Examples of useful alkyl acrylate monomers include, but are not limited to, n-butyl acrylate, hexyl acrylate, octyl acrylate, isooctyl acrylate, 2-ethylhexyl acrylate, isononyl acrylate, decyl acrylate, dodecyl acrylate, lauryl acrylate, octadecyl acrylate, and mixtures thereof.

The optional reinforcing co-monomer is a monoethylenically unsaturated monomer having a homopolymer glass transition temperature greater than about 25° C. is preferably co-polymerized with the acrylate monomers. Examples of useful co-polymerizable monomers include, but are not limited to, meth(acrylic) acid, N-vinyl pyrrolidone, N-vinyl caprolactam, substituted (meth)acrylamides, such as N,N,-dimethyl acrylamides, acrylonitrile, isobornyl acrylate, and mixtures thereof. When a co-polymerizable monomer is used, the alkyl acrylate is present in the composition in amounts from about 50 to 99 parts by weight and the co-polymerizable monomer is present in corresponding mounts from 50 to 1 parts by weight wherein the total amount by weight is 100.

A preferred polar IOA/AA adhesive contains a weight ratio of IOA/AA of from about 80/20 to 98/2. Useful IOA/AA based pressure sensitive adhesives include those having ratios of 90/10 and 94/6. Other useful pressure sensitive adhesives include non polar copolymers of isooctyl acrylate/methacrylate (IOA/MA), isooctyl acrylate/isobornyl acrylate (IOA/IBA), or ethyl acrylate/methyl acrylate (EA/MA). The pressure sensitive adhesive can include an added tackifier and/or plasticizer in a tackifier to adhesive base weight ratio or a plasticizer to adhesive base weight ratio of up to about 2:1. Suitable tackifiers include hydrogenated rosin esters commercially available as Foral 85™, Foral 105™, or Abitol™E, and hydrocarbon tackifiers such as Regalrez™, all available from Hercules Incorporated of Wilmington, Del. Suitable plasticizers include hydrocarbon oils such as Shellflex™ (available from Shell Chemical Co.), USP grade mineral oil, and phthalates including alkyl phthalates such as dioctyl phthalate and diisononyl phthalate, and allyl phthalates.

The amount of viscoelastic material 38 coated onto backing 32 should be sufficient to fill enough voids in the porous matrix 20 to provide the desired degree of light transmissivity. Viscoelastic material 38 can be applied to the backing 32 by any suitable means, including by coating from organic solvents or water borne emulsions with a knife coater or roll coater, by 100% solids post-cured oligimers, or by hot melt coating or by extrusion. The viscoelastic material 38 can be applied in amounts of about 0.16 to 2.6 grams per 155 cm$^2$ (2.5 to 40 grains per 24 sq. in.) to provide a layer approximately 6.3 to 100 micrometers (0.00025 to 0.004 inches) thick, however more or less can be applied as desired.

The components of the viscoelastic material 38 should be chosen to provide a desired rate of migration into the porous matrix 20 which preferably increases with temperature in a sufficiently similar way to the change in reaction rate of the object to be monitored to provide a suitable time-temperature indicator. By controlling the properties of the viscoelastic material, the indicating device can be constructed to provide a visually observable indication of a predetermined cumulative thermal exposure. It will often be useful to provide a indication of a predetermined allowable cumulative thermal exposure for a particular perishable item, such as food, medicine, photographic supplies, and vaccines. Accordingly, it is desirable to be able to select a viscoelastic material 38 having suitable characteristics for the particular product to be monitored.

As discussed above, $Q_{10}$ and Ea are useful as a quantification of rate of degradation or other rate of change of an object to be monitored. It is also useful to quantify the effective Ea or $Q_{10}$ of the viscoelastic material 38 so as to select a suitable composition of the viscoelastic material for the object to be monitored. As with the particular object to be monitored, it is possible to formulate various viscoelastic materials 38 and perform experiments on indicators comprising the viscoelastic materials to determine the rate of change of the visually observable indication at various temperatures for each viscoelastic material 38. It is then possible to calculate a measured Ea and/or $Q_{10}$ for various viscoelastic materials and select a viscoelastic material to best fit the intended use of the indicator. It is also possible to measure the temperature dependence of the flow properties of the viscoelastic material independently and estimate the effective activation energy. For example, one can measure the dynamic mechanical properties of the material as a function of frequency at various temperatures and perform time-temperature superposition according to the classical procedures as is known in the art. The temperature dependent shift factors which result can be fitted to the Williams-Landel-Ferry equation and then the effective activation energy can be calculated according to the equation of Ferry. See Ferry, supra. Any of a number of other rheological properties could be measured such as creep compliance, dynamic viscosity, etc., and their temperature dependence used to estimate the effective activation energy.

It has been observed that the viscoelastic materials formulated in accordance with the embodiments and examples described herein have an Ea which varies somewhat with temperature. In that case, an average or effective Ea over a temperature range can be calculated. Correspondingly, the $Q_{10}$ value of the viscoelastic material for a particular increase in temperature, for example from 20° C. to 30° C., would be expected to be somewhat different from the $Q_{10}$ value for an increase in temperature from 30° C. to 40° C. Nonetheless, the Ea and $Q_{10}$ has been observed to vary with temperature by a small enough amount that the viscoelastic materials are still useful as an accurate integrator of temperature over time to provide an accurate indication of predetermined allowable thermal exposure. Furthermore, the Ea becomes less sensitive to temperature change as temperatures increase above the $T_g$. An effective, or average, Ea over a given temperature range can be calculated for each viscoelastic material. The viscoelastic material can then be chosen to provide an indication of a predetermined thermal exposure for a given object to be monitored.

Another property of the indicator which has been observed to influence the suitability of the indicator to a particular object to be monitored is the runout time. This is the period of time it takes for migration of the viscoelastic material 38 to fill the microvoids of the porous matrix 20 to a sufficient degree to obtain sufficient change in light transmissivity of porous matrix 20 to provide the visually observable indication. As described in greater detail below, this is the point at which a latent image matches whatever reference has been established, or at which point latent indicia becomes readable by a user or by a suitable scanning device. Or, this is the point at which an obscurable image becomes noticeably obscured, or an obscurable indicia is no longer readable by a user or a suitable scanning device. The viscoelastic material 38, the characteristics of the porous matrix 20, and the optical density or blackness of the substrate and indicia control the runout time of a particular indicator.

By selecting a viscoelastic material with the desired effective Ea (or $Q_{10}$) and viscoelastic material and porous matrix system with the desired runout time, it is possible to provide an indication of cumulative thermal exposure for a particular perishable item.

With particular reference to the preferred viscoelastic materials 38 which comprise pressure sensitive adhesives as discussed above, the following general observations have been made. Values of effective Ea from about 5 kcal/mole to about 70 kcal/mole have been observed in the pressure sensitive adhesives described herein. It has been observed that the choice of elastomer on which the pressure sensitive material is based is a primary factor in determining the effective Ea for a particular viscoelastic material. For instance, 100% IOA pressure sensitive adhesives have an Ea in the range of about 12–20 kcal/mole over the temperature range of 0° to 50° C. Adding increasing amounts of tackifier generally raises the glass transition temperature and the effective Ea of the pressure sensitive adhesive. Adding plasticizer generally decreases the glass transition temperature and effective Ea of the pressure sensitive adhesive. By selecting particular pressure sensitive adhesives as viscoelastic material 38, and by providing various amounts of tackifier and/or plasticizer, the migration characteristics of the viscoelastic material can be controlled. The viscoelastic material 38 is preferably in its amorphous liquid state to at least below 50° C., more preferably below 20° C., still more preferably below 0° C., yet more preferably below −20° C., and most preferably to at least below −40° C. The viscoelastic materials described herein have been observed to have a glass transition temperature of from about −125° C. to 10° C. Some of the viscoelastic materials described herein remain a usable viscoelastic liquid to temperatures at least as high as 100° C., and it may be possible to formulate viscoelastic materials useful to temperatures as high as 200° C. or higher.

The indicator according to the present invention preferably includes an actuating means for selectively switching the indicator from its unactivated state to its activated state. When the indicator is in the unactivated state, the actuating means maintains the viscoelastic material 38 substantially out of contact with the porous matrix 20. When the indicator is in its activated state, the actuating means maintains the viscoelastic material 38 and the porous matrix 20 in substantial contact with one another. With respect to the indicator of FIGS. 1A and 1B, the actuating means can comprise any suitable means, whether mechanical or manual, for applying the second laminate 30 to the first laminate 12, thereby activating the indicator. This can optionally include means to apply the first laminate 20 to the object to be monitored. Prior to activation, the first and second laminates can be stored apart almost indefinitely.

Figure 2:
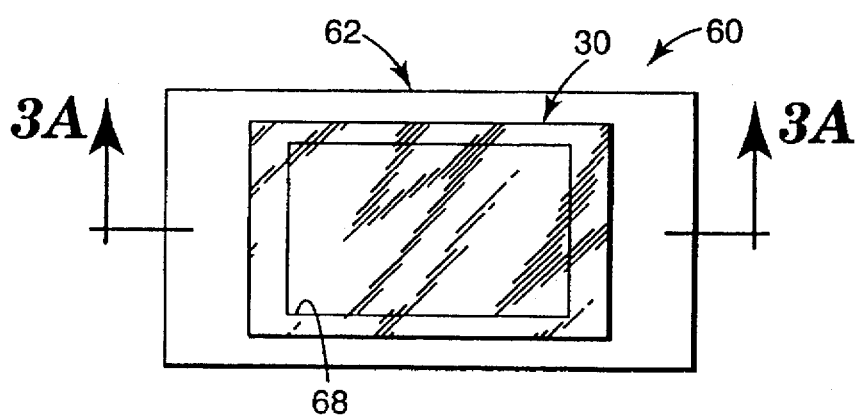
FIG. 2 is a plan view of a second embodiment of a time-temperature integrating indicator constructed in accordance with the present invention.
Figure 3A:
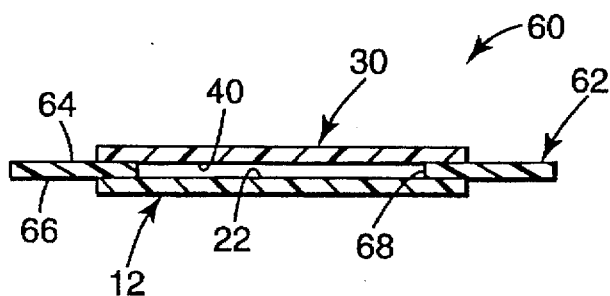
FIG. 3A is a cross-sectional view of the indicator of FIG. 2 in its unactivated state, taken along line 3A—3A.
Figure 3B:
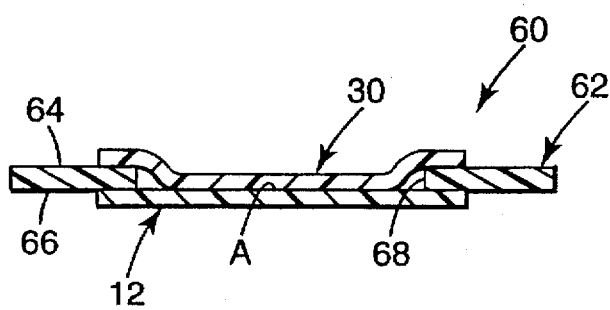
FIG. 3B is a view of the indicator of FIG. 3A in its activated state.

The actuating means can also comprise any suitable means for maintaining the first and second laminate as an integral but unactivated indicator which can be activated at any desired time, either before or after mounting to the object to be monitored. One preferred embodiment of an actuating means is illustrated in FIGS. 2–3B. For clarity, the first laminate 12 and second laminate 30 are illustrated in the indicator 60 in FIGS. 2–3B without illustrating the individual components of the laminates 12 and 30. The first laminate 12 and second laminate 30 are provided in accordance with the embodiment described above with reference to FIGS. 1A and 1B. In this embodiment, the actuating means comprises a spacer 62 having a top surface 64 and bottom surface 66. Opening 68 is provided in spacer 62. One preferred shape of opening 68 is rectangular as illustrated in FIG. 2, but it may be circular, for example, or any other shape as desired. The preferred opening 68 is illustrated as being an enclosed opening, completely bounded by the body of the spacer 62, but may be open on one or more sides. The spacer 62 is preferably a single piece as illustrated, but instead may comprise two or more separate components. The spacer can be formed from plastic, paper, wood, ceramic, cloth, foamed materials and foam tape such as polyethylene, urethane, and neoprene, or any other suitable material. A preferred spacer 62 is fabricated from solid or foamed plastic approximately 1 mm (0.040 inches) thick, and can be approximately 22 mm (0.87 inches) wide by 24 mm (0.94 inches) long, although it may be of any other suitable size.

Second laminate 30 is provided on top surface 64 of spacer 62 with the exposed surface 40 of viscoelastic material 38 adjacent the top surface 64. Second laminate 30 at least partially overlays opening 68. In the embodiment illustrated in FIG. 2, the second laminate 30 completely overlays the opening 68, and is somewhat smaller than the spacer 62. Alternatively, the periphery of first laminate 30 may be partially or completely coextensive with the periphery of spacer 62. When the viscoelastic material 38 comprises a pressure sensitive adhesive, the second laminate 30 may be conveniently adhered to top surface 64 by the viscoelastic material. Alternatively, the second laminate 30 may be adhered to the top surface 64 by way of optional second backing 42 which can comprise a pressure sensitive adhesive and be sufficiently larger than the first backing 32 to adhere second laminate 30 to the top surface 64 of the spacer 62. The second laminate may be mechanically fastened to the top surface of the spacer 62, for example, by means of staples, a blister pack or other suitable case or package means.

The first laminate 12 is similarly provided on bottom surface 66 of spacer 62 with exposed surface 22 of porous matrix 20 adjacent the bottom surface 66. As illustrated in FIG. 3A, spacer 62 maintains the viscoelastic material 38 and porous matrix 20 out of contact with one another when the indicator is in its unactivated state. The first laminate 12 must at least partially overlay the opening 68 and a portion of the second laminate 30 such that a portion of the first laminate 12 and second laminate 30 may be brought into contact with one another through opening 68 when the indicator is in its activated state as illustrated at A in FIG. 3B. The first laminate 12 may be mounted to the bottom surface 66 of spacer 62 by means of a pressure sensitive adhesive around the periphery of the bottom surface 68 of the spacer 62. Alternatively, the first laminate 12 may be mechanically mounted on the spacer 62 by means of staples or any suitable blister pack or other housing or case.

The spacer 62 can maintain the viscoelastic material 38 out of contact with the porous matrix 20 for a prolonged period of time to keep the indicator in its unactivated state. This provides the advantage of having an indicator 60 with a very long shelf life prior to activation. This allows the indicator 60 to be fabricated at a place and time remote from the object to which it will ultimately be adhered. Also, the indicator 60 may be mounted on an empty container, such as a food can or jar, or a medicine vial, for example, and remain unactivated for a long period of time. After the container is filled with its desired contents, the indicator 60 may then be activated as illustrated in FIG. 3B. This may be done simply with a finger, or by use of a suitably sized plunger, brush, or other device. The indicator may also be maintained in its unactivated state after the container is filled and may, for example, be activated when the container is first opened, for example by the gripping force of a user's hand while removing a cap from a container.

Figure 4:
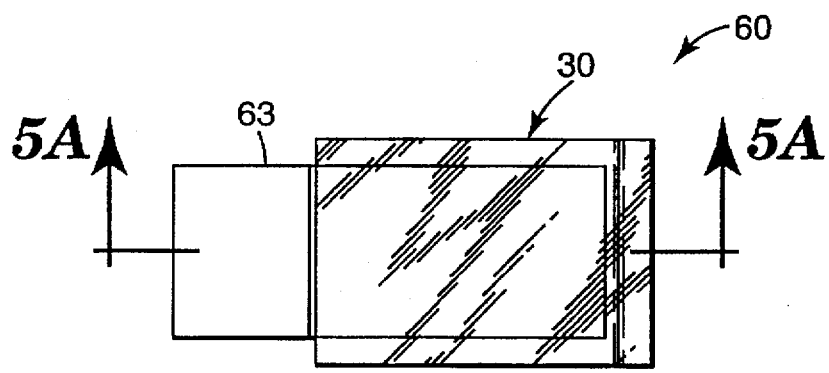
FIG. 4 is a plan view of a third embodiment of a time-temperature integrating indicator constructed in accordance with the present invention.
Figure 5A:
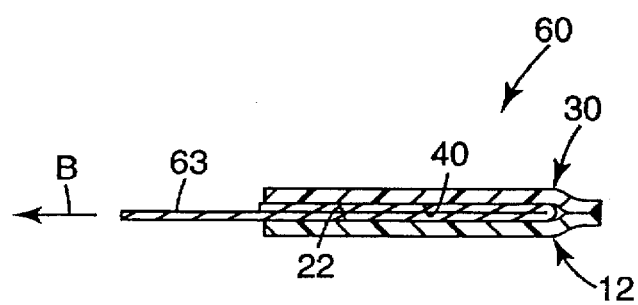
FIG. 5A is a cross-sectional view of the indicator of FIG. 4 in its unactivated state, taken along line 5A—5A.

Another preferred embodiment of the actuating means is illustrated in FIGS. 4–5B. The actuating means of this embodiment comprises a barrier film 63. The barrier film 63 may comprise, for example, any suitable paper or film release liner or sheet. Barrier film 63 is disposed between at least a portion of second laminate 30 and first laminate 12. The exposed surface 40 of the viscoelastic material 38 is adjacent one side of the barrier film 63, while exposed surface 22 of porous matrix 20 is adjacent the other side of the barrier film. This maintains the indicator in its unactivated state as illustrated in FIG. 5A. First laminate 12 and second laminate 30 may be adhered to one another along three edges of their peripheries around the barrier film 63. To activate the indicator, barrier film 63 is pulled in direction B as shown in FIG. 5A. This allows the remaining portions of the first laminate 12 and second laminate 30 to come into contact with one another as illustrated in FIG. 5B. It is also possible to sequentially activate portions of the indicator by partially removing barrier film 63. The barrier film 63 is preferably J-folded as shown to facilitate removal by having a sliding release against the porous matrix 20 and a peel off, non-sliding release from the exposed surface 40 of the viscoelastic material 38. Alternatively, the first laminate 12 and second laminate 30 may be connected at only one edge, with an unfolded barrier film 63 being removed by folding open the first and second laminates far enough to allow the barrier film 63 to be peeled off of the second laminate 30.

Barrier film 63 may be advantageously employed when it is desired to delay activation of the indicator. For instance, the indicator can be fabricated at a time and place remote from the object whose cumulative thermal exposure is to be monitored. The indicator can be activated when attached to the object by removing the barrier film. Alternatively, the activator can be mounted on an empty container and activated upon filling the container as described with reference to the embodiment of FIG. 2. Or, the present embodiment may be used where it is desired to activate the indicator after a user opens the container and thereby exposes the contents to ambient conditions or adds or mixes ingredients. For instance, an indicator according to the present embodiment may be affixed to a container 250 which is sold to the end user with the indicator unactivated. The indicator may be affixed to the body 252 of the container while the exposed end of the barrier film may be connected to the cap 254 of the container as illustrated in FIG. 6A. Removal of the cap 252 would withdraw the barrier film 63 from the indicator as illustrated in FIG. 6B, thereby activating the indicator. Such an arrangement may be advantageously employed with cosmetics, for example.

Another preferred embodiment of the actuating means is illustrated in FIGS. 7A and 7B. In this embodiment, the second laminate 30 comprises a first backing 32 which is embossed to have valleys, or proximate portions, 31, and peaks, or remote portions, 33. The valleys 31 are initially adhered to the corresponding portions of the porous matrix 20, and may or may not locally transparentize those portions. However, the first and second laminates are maintained substantially out of contact in the raised areas, or peaks 33. The indicator is activated by pressing on the second laminate 30 with any suitable means to cause at least a portion of the peaks 33 to come into contact with the porous matrix 20. When the viscoelastic material 38 is a pressure sensitive adhesive, this will maintain the peaks in contact with the porous matrix. Other suitable mechanical means may be provided for maintaining contact, such a blister pack which, when depressed, will maintain pressure on the second laminate 30. The substrate 14 of first laminate 12 may similarly have formed therein proximate portions and remote portions in addition to or instead of the second laminate 30.

Another preferred embodiment of the actuating means is illustrated in FIGS. 8A and 8B. This embodiment includes actuating substrate 61 which can comprise any suitable construction including those described herein for substrate 14 and backing 32. First laminate 12 and second laminate 30 are each affixed to actuating substrate 61 alongside one another by any suitable means, such as a pressure sensitive adhesive. The exposed surface 22 of porous matrix 20 and the exposed surface 40 of viscoelastic material 38 both face away from activating substrate 61, maintaining the indicator in its unactivated state as illustrated in FIG. 8A. Preferably, a release liner 65 is initially affixed to the exposed surfaces 22 and 40 to prevent contamination. To activate the indicator, the release liner 65 is removed and the substrate 61 is folded as indicated by arrow C, thereby bringing the viscoelastic material 38 into a fin seal type contact with the porous matrix 20 as illustrated in FIG. 8B. Alternatively, first laminate 12 and second laminate 30 can be affixed to opposite surfaces of substrate 61 as illustrated in FIG. 8C, to be wrapped around an object or container 11, and brought into overlapping contact as illustrated in FIG. 8D. A mounting adhesive 26 may be included on the substrate 61 as shown.

Figure 9A:
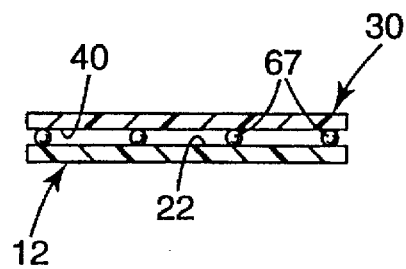
FIG. 9A is a cross-sectional view of a further embodiment of a time-temperature integrating indicator constructed in accordance with the present invention in its unactivated state.
Figure 9B:
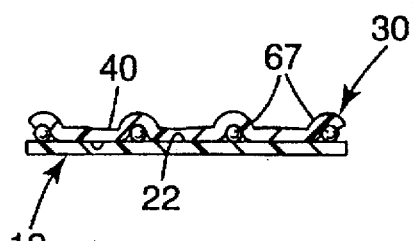
FIG. 9B is a view of the indicator of FIG. 9A in its activated state.

A further preferred embodiment of the actuating means is illustrated in FIGS. 9A and 9B. In this embodiment, the actuating means comprises spacing bodies 67 disposed between the first laminate 12 and second laminate 30. Spacing bodies 67 are illustrated as spherical, but may be of any suitable configuration, including polyhedrons such as cubes, or bars, rods, ribs, wires and the like. Spacing bodies 67 are sized and arranged to keep the exposed surface 40 of the viscoelastic material 38 and the exposed surface 22 of the porous matrix 20 substantially out of contact when the indicator is in its unactivated state as illustrated in FIG. 9A. The indicator is activated by pressing on the indicator with any suitable means to bring the exposed surfaces 40 and 22 in substantial contact with one another between the spacing bodies 67 as illustrated in FIG. 9B. When the indicator is activated, viscoelastic material 38 conforms around the spacing bodies 67 when using spacing bodies which retain their shape. Alternatively, the spacing bodies may collapse under pressure, as is taught in U.S. Pat. No. 3,413,168, "Adhesive Bonding Method Permitting Precise Positioning," (Danielson et al.), the entire disclosure of which is incorporated herein by reference.

Figure 10:
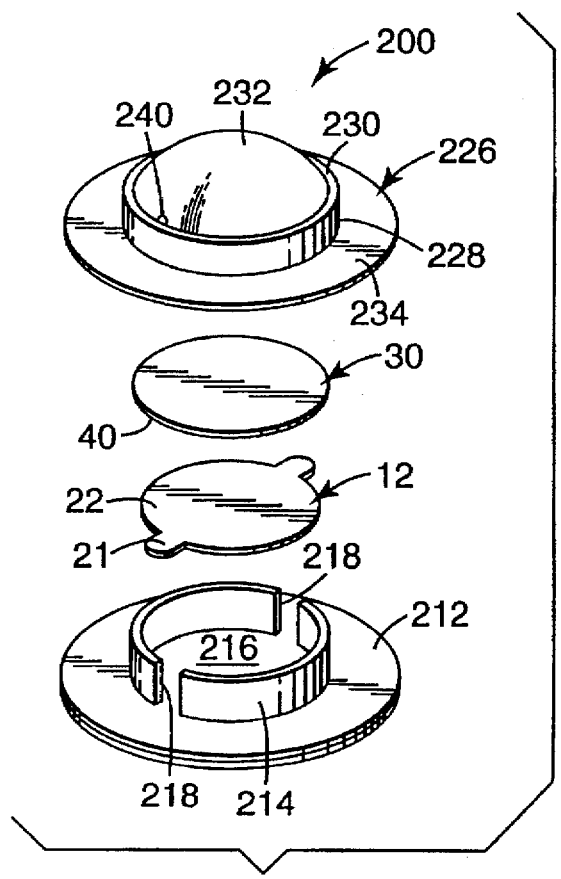
FIG. 10 is an exploded view of a further embodiment of an indicator according to the present invention.

Another preferred embodiment of the actuating means is taught by U.S. Pat. No. 4,793,717, "Device for Visually Indicating a Pressure or Temperature Condition" (Manske), the entire disclosure of which is incorporated herein by reference. As illustrated in FIG. 10, actuating means 200 includes a base 212 having integral upstanding arcuate walls defining shoulders 214 which in turn define an interior cavity 216. The shoulders 214 are separated by diametrically opposed locating slots 218. The base 212 and the integral upstanding shoulders 214 may be constructed of any material having suitable rigidity, and are preferably formed of polyester film.

First laminate 12 is sized to be accepted within the reservoir 216 adjacent the base 212, with exposed surface 22 facing away from base 12. First laminate 12 includes diametrically extending tabs 21 which are adapted to fit within the base slots 218 and which extend beyond the outer surface of the shoulders 214. The tabs 21, in conjunction with the slots 218, prevent rotation of the first laminate 12 and are utilized to maintain the first laminate 12 adjacent the base 212 in a manner to be described hereinafter. Second laminate 30 is sized to rest upon the shoulders 214 and not extend beyond the outer surfaces of the upstanding shoulders 214. Exposed surface 40 faces first laminate 12.

A cover 226 overlies the second laminate 30, first laminate 12, and the base 12 and includes a cylindrical wall 228 adapted to fit closely around the outer surface of the shoulders 214, an inwardly extending ledge 230 formed as an annular ring overlying the shoulders 214, a convergently sloped central portion 232 attached at its periphery to the ledge 230 and a perimetrical boundary 234 coextensive with the base 212. The boundary 234 may be attached to, or sealed to if preferable, the base 212 by any suitable means such as adhesive bonding, heat sealing, spot welding, or the like. The inwardly extending ledge 230 bears against the upstanding shoulders 214 and clamps the second laminate 30 therebetween. Alternatively, second laminate 30 may be adhered to the inner surface of dome 232. Or, viscoelastic material 38 may be applied directly to the inner surface of dome 232, in which case dome 232 takes the place of first backing 32.

Since the tabs 21 extend through the slots 218 and beyond the outer surface of the shoulders 214, the tabs 21 are contained between the boundary 234 and the base 212, simultaneously preventing rotation and upward movement of the tabs 21 and the first laminate 12. It will be recognized that the tabs 21 may be eliminated and upward movement of the first laminate 12 prevented by fastening the first laminate 12 to the base 212 by such conventional means as adhesive bonding or mechanical fasteners.

Figure 11A:
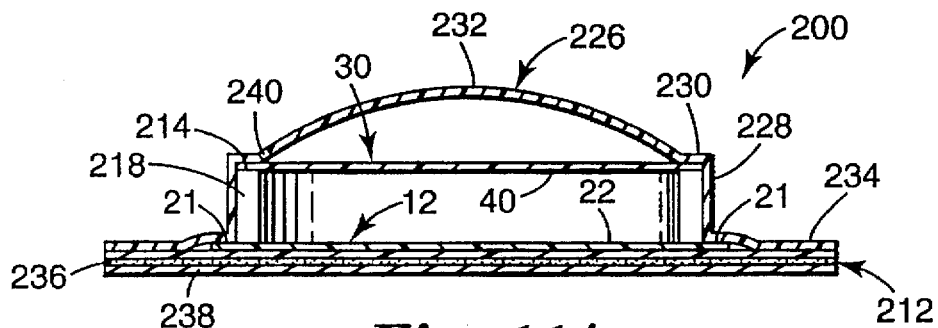
FIG. 11A is a cross-sectional view of the indicator of FIG. 9 in its unactivated state.
Figure 11B:
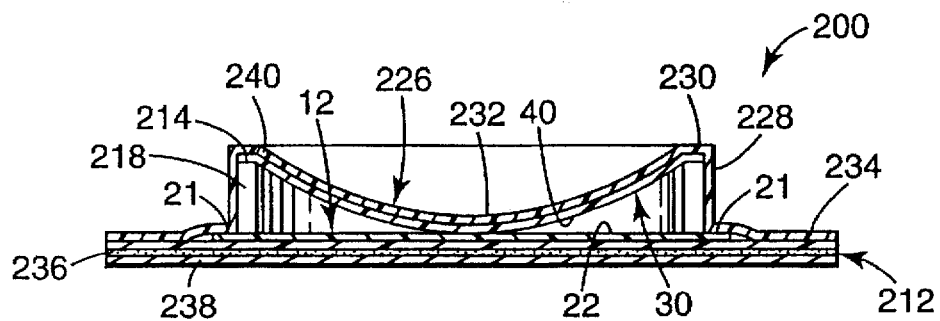
FIG. 11B is a view of the indicator of FIG. 10A in its activated state.

Central to the cover 226 is the convergently sloped portion 232 which may assume any pyramidal or conical shape which will permit inversion, but for simplicity of manufacture is preferably formed as a shallowly curved convex spherical dome attached at its periphery to the ledge 230. The dome 232 had a radius selected to permit a "snap" movement between non-activated and activated positions of stability and opposite curvature, as shown in FIGS. 11A and 11B, respectively. The cover 226 may be formed of any material suitable for the base 212, with the additional constraint that the domed portion 232 must be transparent to afford visual observation into the actuating means 200.

FIG. 11A shows the dome 232 in its unactivated position; extending convexly away from the base 212. Upon application of force to the outer surface of the dome 232, the dome 232 travels a short distance and then snaps to its second position of stability, the activated position, which is exteriorly concave to press against the base 212 within the cavity 216, as shown in FIG. 11B. When in the activated position, the dome 232 maintains the second laminate 30 contact with the first laminate 12.

The outer surface of the base 212 may be coated with a pressure sensitive adhesive 226 and covered with an overlying protective film or release liner 228. A small hole 240 communicating between the outer surface of the cover 226 and the inner reservoir 216 is provided in the ledge 230 to permit the escape of air trapped within the actuating means 200 as the dome 232 moves from its non-activated position to its activated position.

In the activating means describe herein which are activated by pressing the first laminate 12 and second laminate 30 together, it is also possible to activate the indicator by applying a vacuum between the laminates to draw them together.

Figure 12:
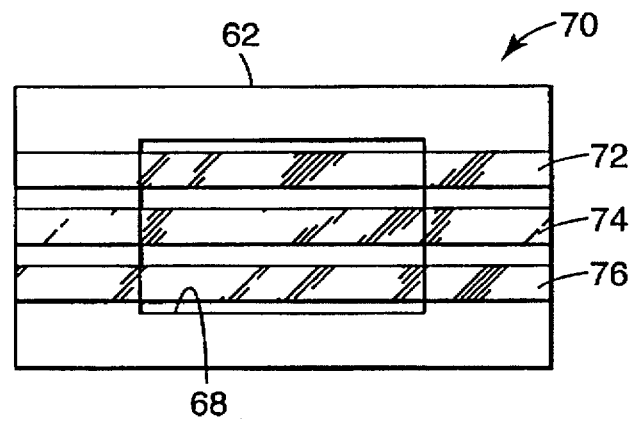
FIG. 12 is a plan view of a further embodiment of an indicator according to the present invention.

Any of the indicators described herein may be provided with more than one second laminate 12. As seen in FIG. 12, it is possible to have, for example, three second laminates 72, 74 and 76. Each of the second laminates can have a different viscoelastic material 38 to indicate a respective predetermined allowable cumulative thermal exposure. The indicator may also, or instead, have a plurality of different porous matrices 20 to provide varying migration rates or runout times for the indicator. The plurality of porous matrices 20 may also have different substrate colors and/or densities to provide a variety of desired visual indications. It is possible to have separate substrates 14 each having a different porous matrix 20, or a plurality of porous matrices 20 formed on a single substrate 14.

Figure 13A:
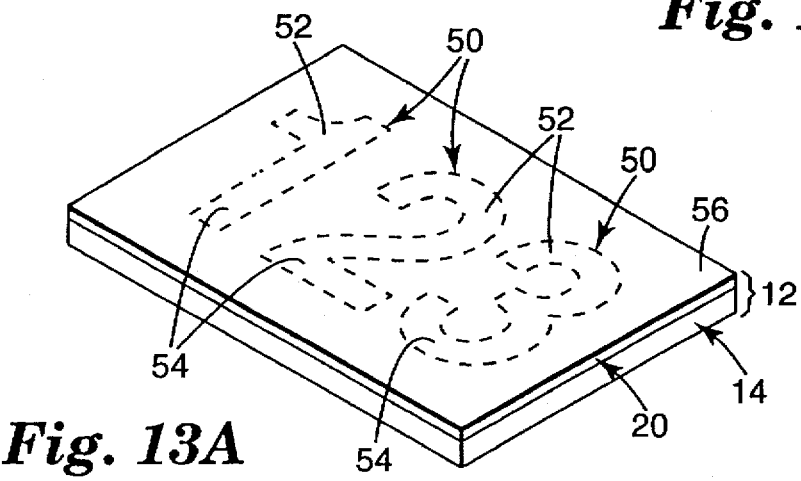
FIG. 13A is an isometric view of an unactivated first laminate portion of the indicator according to the present invention, including latent indicia which is not yet visually observable.

As illustrated in FIGS. 13A and 13B, the indicator of the present invention can comprise latent indicia 50 which initially is not visually observable when the porous matrix 20 is opaque prior to migration of the viscoelastic material 38 into the matrix. The latent indicia 50 becomes visually observable as migration of the viscoelastic material 38 into the porous matrix 20 renders the matrix 20 increasingly light transmissive. The indicator can include obscurable indicia 51 instead of latent indicia (FIGS. 14A, 14B, and 14C) or in addition to latent indicia (FIGS. 15A and 15B). The obscurable indicia 51 is initially visually observable when the porous matrix 20 is opaque prior to migration of the viscoelastic material 38 into the matrix 20. The obscurable indicia becomes increasingly obscured as migration of the viscoelastic material 38 into the porous matrix 20 renders the matrix 20 increasingly light transmissive. The indicator can thereby provide a visually observable indication of cumulative thermal exposure by revealing latent indicia 50, obscuring obscurable indicia 51, or both. The visually observable indication is provided when a latent indicia is sufficiently revealed to be visually observable or readable with a bar code scanner or other such device, or when an obscurable indicia is sufficiently obscured such that its change in appearance is visually observable or the obscurable indicia is no longer readable by a user or with a bar code laser scanner or other such optical comparison device. It is not necessary to completely obliterate an obscurable indicia, although the indicator may do so when the porous matrix 20 becomes light transmissive.

The latent indicia 50 may be provided in any of several ways. The optical density of the latent indicia 50 preferably increases by at least 0.2 as the viscoelastic material 38 migrates into the porous matrix 20. An indicator may include one or more latent images provided in any combination of the manners described herein. If the substrate 14 is light transmissive, it is possible to provide latent indicia on the first side 16 of substrate 14. As the matrix 20 becomes transparent, the latent indicia 50 becomes visually observable through the substrate 14, matrix 20, viscoelastic layer 38, and backing 32. Similarly, the latent indicia 50 can be provided on an optional second substrate provided on the first side 16 of substrate 14. The latent indicia 50 may be provided on the object 11 itself when the indicator is mounted on the object 11 as seen in FIG. 1B.

The latent indicia 50 may be provided on the second side 18 of the substrate 14, with the porous matrix 20 overlaying the latent indicia. In such an embodiment, it is not necessary that the substrate 14 be light transmissive, although it may be light transmissive. Depending on the latent indicia and the surface of the object 11 to which the indicator may be mounted, it may be preferable that the substrate 14 is opaque to provide a contrasting background for latent indicia 50 provided on second side 18 of the substrate. When the porous matrix 20 becomes light transmissive, the latent indicia becomes visually observable through the matrix 20, viscoelastic layer 38, and backing 32.

Latent indicia 50 may be provided in or on the exposed surface 40 of the porous matrix 20, as illustrated in FIG. 13A. In such an embodiment, an invisible repellent 52 is applied to a first portion 54 of the porous matrix 20 as is taught in U.S. Pat. No. 5,354,598, "Article Capable of Displaying Defined Images," (Arens), the entire disclosure of which is incorporated herein by reference. In this manner, the viscoelastic material 38 can migrate into the second portion 56 of the porous matrix at 20b in response to thermal exposure, but cannot migrate into the first portion 54 of the porous matrix at 20a as illustrated in FIG. 13C. Alternatively, the repellent may slow the migration rather than prevent it, and thereby provide a two step indication of thermal exposure. By using a contrasting colored or opaque substrate 14, the latent indicia 50 becomes visually observable as the second side 18 of the substrate becomes visually observable through the second portion 56 of the matrix, as illustrated in FIG. 13B. For clarity, not all of second portion 56 is illustrated as being of increased transparency in FIG. 13B, although substantially all of second portion 56 will become transparent at the same rate after activation of the indicator. The second portion 56 of the porous matrix may provide a negative image of the latent indicia as illustrated in FIG. 13B, or may instead provide a positive image of the latent indicia. Alternatively, the repellent may be applied to the exposed surface 40 of the viscoelastic material. The repellent will then slow or prevent migration locally as described above. The repellent 52 may be any suitable material to locally slow or prevent migration of the viscoelastic material 38 into the first portion 54 of the porous matrix. One preferred repellent comprises a fluorochemical repellent available under the tradename Scotchguard™, available from Minnesota Mining and Manufacturing Company, St. Paul, Minn. Other suitable repellents include Elmers Glue-All™, available from Borden Inc., Cincinnati, Ohio, and silicone. Latent indicia may be similarly provided by applying viscoelastic material 38 to backing 32 in a pattern comprising the latent indicia. For example, the latent indicia may be provided by reverse printing a latent textual message such as "REPLACE" with the viscoelastic material 38 on the backing 32. This pattern coating will migrate into the porous matrix 20 to locally increase the light transmissivity of the porous matrix. As the substrate 14 becomes visible through the locally transparent portion of the porous matrix, the latent indicia 50 becomes visually observable. Likewise, the porous matrix 20 can be applied in a pattern to substrate 14.

The obscurable indicia 51 may be provided in any of several ways. An indicator may include one or more obscurable images provided in any combination of the manners described herein. What is common to the embodiments of obscurable indicia described below is that the obscurable indicia becomes less discernible against its background as the viscoelastic material 38 migrates into the porous matrix 20 and renders the matrix increasingly light transmissive. For example, as the second side 18 of the substrate 14 becomes increasingly visible through the porous matrix 20, the obscurable indicia 51 becomes less discernible. The color and optical density of the second side 18 of the substrate and of the obscurable indicia 51 are chosen such that the contrast of the obscurable indicia 51 against its background is reduced as the light transmissivity of the porous matrix 20 increases. If a light transmissive substrate 14 is used, the increasing visibility of an optional second substrate or of the object 11 renders the obscurable indicia 51 less discernible. Preferably, the difference of the optical density of the obscurable indicia 51 relative to its background decreases by at least 0.2 as the viscoelastic material 38 migrates into the porous matrix 20.

The obscurable indicia 51 may be provided on the porous matrix 20. The obscurable indicia may be printed on the exposed surface 22, and should have a color and density similar to the second side 18 of the substrate. As the porous matrix 20 becomes increasingly light transmissive, the contrast of the obscurable indicia 51 against the second surface 18 is sufficiently decreased to obscure the indicia.

The obscurable indicia 51 may be provided by permanently transparentizing a portion of the porous matrix 20, as is known in the art and is exemplified by U.S. Pat. No. 4,428,321, "Thermally-Activated Time-Temperature Indicator," the entire disclosure of which is incorporated herein by reference. As the viscoelastic material 38 migrates into the remainder of porous matrix 20, the matrix becomes increasingly light transmissive to thereby make the second side 18 of the substrate 14 increasingly visible. This will reduce the contrast between the obscurable indicia 51 and the permanently transparentized portion of the matrix 20 to thereby obscure the indicia. In either of the above two embodiments, the obscurable indicia 51 is initially visually observable through the viscoelastic material 38, first backing 32, and optional second backing 42, if present.

The obscurable indicia 51 may be printed on the exposed surface 40 of the viscoelastic material 38. It will initially be visually observable through the viscoelastic material 38, first backing 32, and optional second backing 42, if present. The obscurable indicia may be provided on the first surface 34 or the second surface 36 of the backing 32. Alternatively, the obscurable indicia may be present on optional light transmissive backing 42 which may be provided on second surface 36 of first backing 32 as seen in FIG. 1A.

One embodiment of an obscurable indicia 51 is illustrated in FIGS. 14A–14C. In this embodiment, the obscurable indicia comprises a bar code 51 which is initially observable as seen in FIG. 14A. As the porous matrix 20 becomes increasingly light transmissive, the second side 18 of substrate 14 becomes visible, reducing the contrast between the bar code 51 and its background sufficiently to render the bar code unreadable by a bar code reader as illustrated in FIG. 14B. For clarity, only a portion of the bar code is illustrated as obscured in FIG. 14B, although generally all of the porous matrix will obscure the bar code at approximately the same rate after the indicator is activated. Alternatively, the obscurable indicia 51 can be obscured by latent indicia 50 which can comprise lines or bands which appear across the obscurable indicia 51 as illustrated in FIG. 14C. The latent indicia can be provided by pattern coating the viscoelastic material 38 on backing 32 as described above.

As seen in FIGS. 15A and 15B, the indicator may comprise both latent indicia 50 and obscurable indicia 51. The obscurable indicia 51 is initially visually observable as seen in FIG. 15A. As the second side 18 of substrate 14 becomes visible, the contrast of obscurable indicia 51 is reduced until it is no longer discernible, as seen in FIG. 15B. The latent indicia 50 initially is not visually observable as illustrated in FIG. 15A, and becomes visually observable as a positive image as illustrated in FIG. 15B.

Figure 16A:
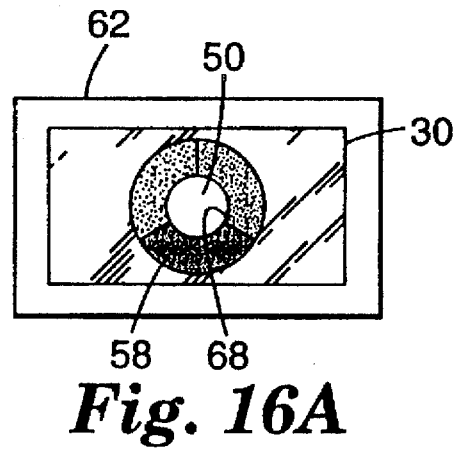
FIG. 16A is a plan view of an indicator according to the present invention including a latent image and a comparison image.
Figure 16B:
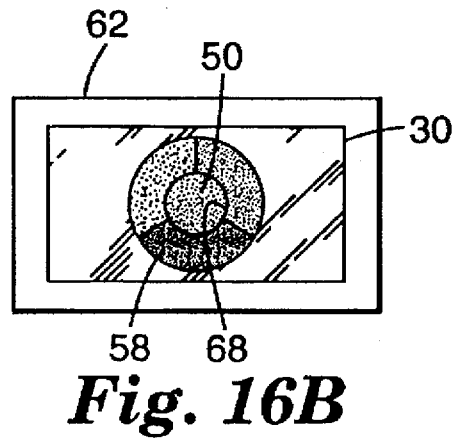
FIG. 16B is a plan view of the indicator of FIG. 16A, in which the latent image has become visually observable.

As illustrated in FIGS. 16A and 16B, the indicator may provide a visually observable indication of cumulative thermal exposure by means of a simple latent image 50 which can be, for example, a circular or rectangular patch. Also provided is a comparison image 58 which can be provided anywhere on the indicator, preferably immediately adjacent to the latent image 50. For example, the comparison image 58 can be printed on the top surface 64 of spacer 62 immediately adjacent opening 68 as illustrated. Alternatively, the comparison image can be provided in any of the manners described above for providing an obscurable image. For example, the comparison image 58 may be provided on the porous matrix adjacent the latent image by printing on a portion of the porous matrix 20 or by permanently transparentizing a portion of the porous matrix as described above. Or comparison image 58 may be printed on the first backing 32 or second backing 42. As described above, migration of the viscoelastic material 38 into the porous matrix 20 will render the latent image 50 increasingly visually observable. When the latent image 50 matches the comparison image 58 in color and density, this provides the visually observable indication of cumulative thermal exposure. Alternatively, the comparison image 58 may comprise a plurality of colors and/or densities. For example, the comparison image 58 may comprise three areas of increasing density as illustrated in FIG. 16A. A visually observable indication of predetermined thermal exposure is provided when the latent image 50 is darker than the lightest comparison image, matches the intermediate comparison image, and is lighter than the darkest comparison image as illustrated in FIG. 16B.

The latent indicia 50 and obscurable indicia 51 may comprise any suitable indicia, including but not limited to textual messages, graphical images, and UPC bar codes. The indicia can be, for example, a printed message to be read by the user. A latent image such as "EXPIRED," "DO NOT USE," or the like may be used to indicate cumulative thermal exposure exceeding a predetermined allowable maximum. An obscurable image such as "FRESH" may be used in addition to, or in place of, the latent image. The indication "FRESH" would become obscured to indicate cumulative thermal exposure exceeding a predetermined allowable maximum. A latent and obscurable image may be combined such that a portion of an image is obscured or replaced by a latent image. Furthermore, obscurable and latent indicia can be combined such that as the latent indicia becomes visible it reduces the contrast of the obscurable indicia until they are substantially the same such that neither the latent nor obscurable indicia is individually discernible. With continued migration of viscoelastic material, the latent indicia can become darker than the obscurable indicia, thereby reversing the obscurable indicia from a positive to negative image, or from a negative image to a positive image.

The indicia may comprise a laser readable bar code such as a UPC symbol. An obscurable bar code indicia would be obscured to indicate cumulative thermal exposure exceeding a predetermined allowable maximum. With the bar code obscured, it would not be readable by a laser bar code reader, thereby preventing sale of an object whose useful shelf life is exceeded. A latent bar code indicia could be used in combination with an obscurable bar code indicia to reprice an item as the remaining shelf life is reduced.

One useful method for measuring the effectiveness of the indicator in providing latent bar code indicia or obscuring an obscurable bar code indicia 51 is by use of an optical meter which provides measurements of the Hunter L scale. The Hunter L scale is a measure of the blackness of an object. When a substrate 14 having a black second side 18 is coated with a preferred embodiment of the porous matrix 20 described above, the exposed surface 22 of the matrix appears light gray. As the viscoelastic material 38 migrates into the matrix 20, the appearance of the exposed surface changes from light gray to dark gray (approaching black) as the second side 18 becomes increasingly visible. This progression can be measured on the Hunter L scale, and has been observed to decrease from a value of about 70 prior to migration of the viscoelastic material 38 to a value of about 20 when the viscoelastic material 38 substantially fills the voids of the matrix 20. An obscurable bar code indicia 51 is printed on the exposed surface 22 prior to activation of the indicator. When the indicator undergoes cumulative thermal exposure, Hunter L measurements are taken. Also, the obscurable bar code indicia is scanned with a laser scanner of the type known as the Quick-Check 5 with a 633 wand, available from Photographic Sciences Corp., of Webster, N.Y. It has been observed that as the Hunter L value of the activated matrix 20 passes below approximately 58–60, the contrast between the obscurable bar code indicia 51 and its background is sufficiently reduced that the bar code reader can no longer read the obscurable bar code 51.

Any of the indicia described herein may be printed on the various components of the indicator by means of any known printing technique including, but not limited to, offset printing, screen printing, thermal transfer, electrophotography, flexographic printing, or rotogravure printing.

The indicator of the particular embodiments described herein was described as having a transparent second laminate 30 through which the visually observable indication could be viewed, and was described as being mountable on object 11 such that first laminate 12 was adjacent the object. It will be recognized of course, that the present invention is not so limited, and instead can include transparent substrate 14 to allow viewing the visually observable indication through the first laminate 12. In such a construction, the indicator could be mounted to object 11 such that viscoelastic material 38 is proximate the object 11. Such an arrangement may include mounting the viscoelastic material directly on the object 11, in which case the object 11 would act as backing 32, and a separate backing 32 may be omitted. Furthermore, the indicator can provide a visually observable indication by selecting a viscoelastic material and porous matrix having sufficiently different indices of refraction such that migration of the viscoelastic material decreases the light transmissivity of the porous matrix. Optionally, a tint may be added to the backing, the viscoelastic material, the porous matrix, and/or the substrate of any of the embodiments described herein as desired to produce the desired visually observable indication.

It will be recognized the indicator of the present invention can be used with a wide variety of objects 11 in addition to the illustrative, non-limiting applications discussed above. The indicator can be used to indicate the time at which an object should be discarded, replaced, or serviced, even if the object does not degrade in response to temperature or is normally used at room temperature. For example, the indicator can be applied to a toothbrush to provide an indication of when the toothbrush should be discarded. The indicator of the present invention can also be advantageously used as a type of security badge or pass. The indicator could be fabricated to indicate a predetermined allowable time at room temperature, for instance. Such an indicator could be incorporated in a badge or pass to allow someone access to an area for a desired period of time, such as a day or any desired number of days. The indicator would be activated at the start of the allowable period and would provide a visually observable change to indicate the allowable period had lapsed.

Figure 17:
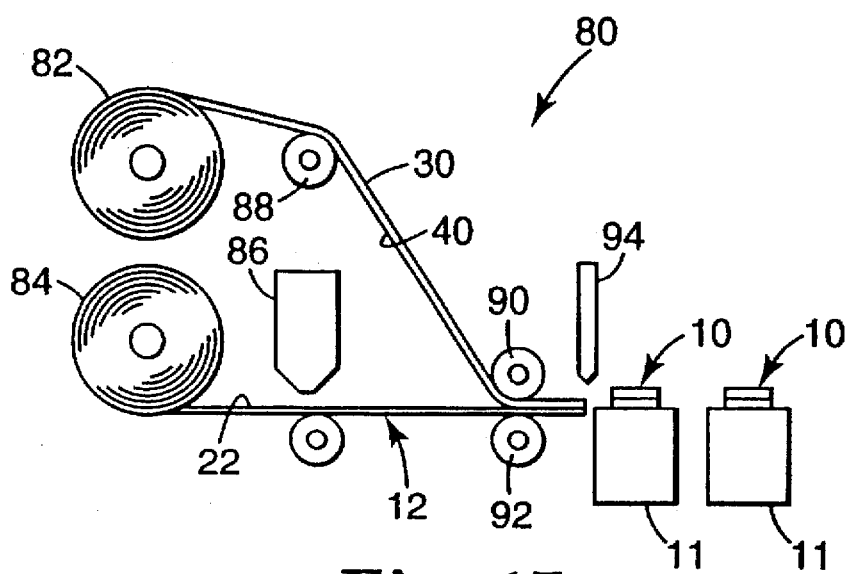
FIG. 17 is a schematic view of a first apparatus for providing an indicator according to the present invention.

The present invention also includes the following methods of providing a time-temperature integrating indicator. The embodiment described with reference to FIGS. 1A and 1B may be advantageously constructed by means of apparatus 80 schematically illustrated in FIG. 17. Apparatus 80 includes unwind roll 82 on which is wound a length of second laminate 30. Apparatus 80 further includes unwind roll 84 on which is wound a length of first laminate 12. The first laminate is unwound from unwind roll 84 and passes by print station 86. Print station 86 applies a latent or obscurable indicia as described above. Alternatively, the strip of first laminate 12 may already comprise indicia before it is wound on unwind roll 84. Second laminate 30 is simultaneously, or sequentially, unwound from unwind roll 82. Second laminate 30 may optionally pass by a print station similar to 86, or may itself already comprise indicia before it is wound on unwind roll 82. First laminate 12 and second laminate 30 are brought into contact at the nip formed between idler rolls 90 and 92 such that exposed surface 22 of the porous matrix 20 is brought into contact with exposed surface 40 of the viscoelastic material 38, thereby activating the indicator. Cutter 94 cuts the long indicator into discrete indicators which are then applied to objects 11 or to a continuous liner for subsequent application to objects 11. Alternatively, the first laminate may be initially adhered to the object 11 and second laminate 30 may subsequently be mounted onto first laminate 12. With apparatus 80, the indicator is unactivated prior to bringing the first and second laminates into contact. Apparatus 80, therefore, is one embodiment of an actuating means according to the present invention.

Figure 18:
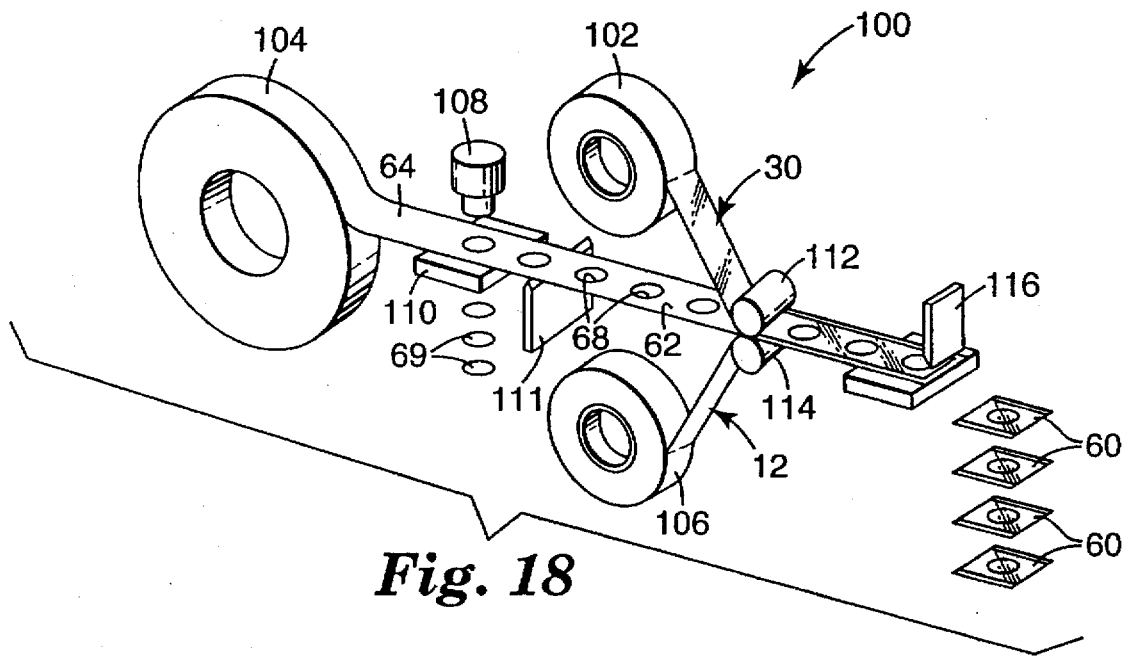
FIG. 18 is a schematic view of a second apparatus for providing an indicator according to the present invention.
Figure 19:
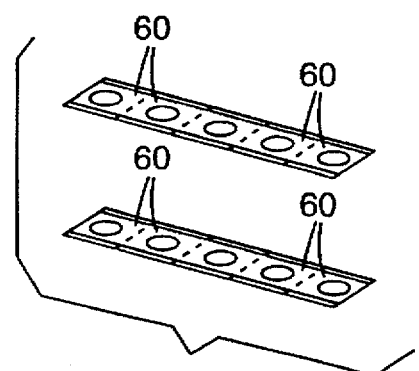
FIG. 19 is an isometric view of a strip of indicators according to the present invention.

A second embodiment of an apparatus for providing indicators according to the present invention is illustrated schematically as 100 in FIG. 18. Apparatus 100 is particularly suited for providing indicators fabricated in accordance with the embodiment described with respect to FIG. 2. Apparatus 100 comprises unwind roll 102 on which is wound a length of second laminate 30, unwind roll 106 on which is wound a length of first laminate 12, and unwind roll 104 on which is wound a length of material for forming spacer 62. The spacer material is unwound from unwind roll 104 and progresses to punch 108 and back up 110 for forming opening 68 in the spacer 62. Cut outs 69 are ejected from the spacer material. The spacer material continues past an adhesive coater 111 and on to the nip formed between idler rolls 112 and 114. First laminate 12 and second laminate 30 are unwound from their respective rolls and progress to the nip formed between rolls 112 and 114, either simultaneously or sequentially. Second laminate 30 is adhered to top surface 64 of the spacer 62 such that exposed surface 40 of the viscoelastic material 38 adheres to the top surface 64 and covers opening 68. First laminate 12 is adhered to the bottom surface 66 of the spacer 62 such that exposed surface 22 of porous matrix 20 adheres to bottom surface 66 and also covers opening 68. The indicator remains in its unactivated state with the viscoelastic material 38 and matrix 20 maintained out of contact as illustrated in FIG. 3A. The indicator then passes to cutter 116 where it is cut into discrete indicators 60 as shown. Alternatively, the indicator can be cut into lengths of several adjoining indicators with perforations therebetween to be separated later as illustrated in FIG. 19. The indicators may be stored unactivated for a long period of time until they are affixed to an object to be monitored and then activated.

The operation of the present invention will be further described with regard to the following detailed examples. These examples are offered to further illustrate the various specific and preferred embodiments and techniques. It should be understood, however, that many variations and modifications may be made while remaining within the scope of the present invention.

TEST METHODS

RUNOUT TIME

The runout time is the time required for an indicator, after it has been activated, to turn from a Color 'L' value of about 65 to a Color 'L' value of 30 in response to cumulative thermal exposure. The Color 'L' is the HunterLab measure of how light or dark a sample is. Higher numbers, i.e., closer to 100, indicate progressively lighter shades of gray approaching white, while numbers approaching 0 indicate progressively darker shades of gray approaching black. Intermediate numbers, between about 25 and 75 are visually distinguishable shades of gray. The color of a time-temperature indicator is measured before activating, and monitored on a periodic basis after activating, using a spectrophotometer (X-Rite™ SP 68 Spectrophotometer available from X-Rite Inc., Grandville, Mich.). The readings are recorded and analyzed using QA-Master™ software (available from X-Rite, Inc.), and the HunterLab Color 'L' value is selected as the measuring system. The test is performed according to manufacturer's instructions and calibrated with the standard color tiles.

GLASS TRANSITION TEMPERATURE

The glass transition temperature ($T_g$) of the viscoelastic material, in degrees Centigrade, is determined using a differential scanning calorimeter (DSC 2920 available from TA Instruments Inc., New Castle Del.) and thermal analyzer software (TA 2200 Thermal Analyzer from TA Instruments), or using a DSC 2200 and related software (formerly available from DuPont Co.)

ACTIVATION ENERGY

The effective activation energy (Ea) of the viscoelastic material, in kilocalories per mole (Kcal/mole) is determined using the Arrhenius relationship discussed above. The rate constant, k, is determined at several temperatures, T, for each viscoelastic material, typically at 12° C., 22.4° C., 30° C., 40° C., and 50° C. A plot is then drawn of ln(k) vs. 1/T(°

Kelvin). A best fit straight line is then determined for the data, the slope of which represents the value of the effective Ea/R, where R is the universal gas constant, 1.987 cal/mole° K. The slope of the line is then multiplied by R to calculate Ea which is reported in the results tabulated below.

INHERENT VISCOSITY

The inherent viscosity of the viscoelastic material is determined using a Canon-Fenske #50 viscometer in a water bath controlled to 25-27 C. The viscosity is measured in ethyl acetate at the concentration indicated in grams per deciliter (g/dl). The procedure is described in ASTM D2857-93. The inherent viscosity provides an indication of molecular weight of the viscoelastic material.

First Laminate A

A dispersion was prepared by mixing 23.23 parts toluene, 3.24 parts disisobutyl ketone, 6.5 parts methyl isobutyl ketone, 7.49 parts hydroxy functional acrylic resin (G-Cure 868-RX-60 available from Henkel Co.), 57.01 parts sodium potassium aluminum silicate (Minex™10 available from Indusmin Limited), 1.11 parts cellulose acetate butyrate (CAB 500-5 available from Eastman Chemical Co.), and 1.42 parts hexamethylene diisocyanate (Desmodur™N-75 available from Mobay Chemical Co.). A laminate having a porous matrix on one side was prepared by curtain coating the dispersion onto a 0.2 mm thick paper laminate construction having two sheets of 40-pound black machine glaze kraft paper that are laminated together by extruding high density polyethylene between the sheets and calendering to a thickness of about 0.18 millimeter (basis weight of the laminate was about 65 grams/square meter). The coating was dried in a forced air oven for about one minute at 100° C. to provide a dry coating thickness of about 12.7 micrometers (0.5 mils).

First Laminate B

A dispersion was prepared by mixing 16.52 parts toluene, 8.23 parts hydroxy functional acrylic resin (G-Cure 868-RX-60), 73.5 parts calcium carbonate (Dryca Flo 125 available from Sylacauga Calcium Products), and 1.42 parts hexamethylene diisocyanate (Desmodur™N-75).

A laminate having a porous matrix on one side was prepared by curtain coating the dispersion onto a 0.2-mm thick paper laminate construction having two sheets of 40-pound rose colored machine glaze kraft paper that are laminated together with high density polyethylene as in Substrate 1. The coating was dried in a forced air oven for about one minute at 100° C. to provide a dry coating thickness of about 12.7 micrometers (0.5 mils).

First Laminate C

A laminate was prepared as in First Laminate B using a green colored kraft paper.

First Laminate D

A laminate was prepared as in First Laminate B using a blue colored paper.

EXAMPLE 1

An acrylate viscoelastic composition was prepared by mixing 100 parts of isooctylacrylate with 0.002 part 2,2'-azobis(isobutyronitrile) initiator (Vazo™64 available from DuPont Company) in 81.8 parts of a solvent mixture having 98 parts ethyl acetate and 2 parts isopropanol in a quart jar. The jar was purged with nitrogen for 2 minutes at 1 liter per minute, sealed, and placed in a rotating heated water bath for 24 hours at about 55° C. The percent solids was 55%, and the inherent viscosity, as determined according to the above-described procedure at a solids concentration of 0.25 grams/deciliter, is shown in Table 1.

A second laminate was prepared by coating the above composition to a dry coating weight (Coat Weight) of 0.38 gram per 155 square centimeters (g/155 cm$^2$) onto a 0.05 millimeter thick optically transparent corona treated polyester film which had been treated on the reverse side with a release coating (carbamate copolymer of polyvinylalcohol and octadecyl isocyanate as disclosed in U.S. Pat. No. 2,532,011 (Dahlquist, et al). The second laminate was dried in an oven at about 71° C. for about 7 minutes.

A time temperature indicator was prepared and activated by applying a 2.54 cm wide strip of the second laminate to First Laminate A and then immediately rolling down with a 2.3 kilogram (5 pound) roller. The Color 'L' value was determined to be about 65. The Color 'L' value was measured on a periodic basis (hourly, daily, weekly, etc., as appropriate for how quickly the indicator changed in darkness) until the Color 'L' value dropped to 30. Test results are shown in Table 1.

EXAMPLES 2-4

Time temperature indicators were prepared as in Example 1 except that the ethyl acetate/isopropanol ratios were varied as shown in Table 1. Different inherent viscosities were obtained by changing the solvent blend ratio of ethyl acetate/isopropanol as indicated in the table.

TABLE 1

| Ex | Solvent Blend | Inherent Viscosity | Coat Weight g/155 cm$^2$ | Ea Kcal/mole | Runout Time - Days at 22.4 C. |
|---|---|---|---|---|---|
| 1 | 98/2 | 0.92 | 0.38 | 13.6 | 15 |
| 2 | 96/4 | 0.69 | 0.36 | 12.2 | 3 |
| 3 | 94/6 | 0.56 | 0.37 | 13.5 | 1.3 |
| 4 | 92/8 | 0.48 | 0.38 | 13.6 | 0.8 |

EXAMPLES 5-8

Time temperature indicators were prepared as described in Example 1 except that the percent solids were varied as shown in Table 2. The solvent was ethyl acetate. Polymerization conditions for Examples 5-7 were the same as in Example 1. Example had 0.15 part Vazo™64 initiator and the polymerization was carried out at 50° C. All of the samples were purged with nitrogen for 3 minutes at 1 liter per minute before polymerizing. Results are shown in Table 2.

TABLE 2

| Ex | % Solids | **Inherent Viscosity | Coat Weight g/155 cm$^2$ | Ea kcal/mole | Runout Time - Days 22.4° C. | 50° C. |
|---|---|---|---|---|---|---|
| 5 | 45 | 1.31 | 0.53 | 16.6 | 143 | 14 |
| 6 | 50 | 1.44 | 0.41 | 15.4 | >165* | 40 |
| 7 | 55 | 1.57 | 0.40 | 13.6 | >165* | 72 |
| 8 | 55 | 2.03 | 0.36 | 13.8 | >165* | 180 |

**Runout not yet achieved at time data was recorded, example was still running.
**Concentration was 0.15 g/dl The data in Table 2 show that longer runout times can be achieved with higher molecular weight viscoelastic materials and that runout times are shortened at higher temperatures.

EXAMPLES 9–33

Time temperature indicators were prepared similarly to Example 1 except using a viscoelastic composition having 94 parts isooctyl acrylate (IOA) with 6 parts acrylic acid (AA) with 0.002 parts Vazo™64 initiator. The viscoelastic material has an inherent viscosity of 0.80 measured at a concentration of 0.25 grams/deciliter.

Viscoelastic compositions for Examples 10–23 were prepared by adding tackifiers and/or plasticizers to the viscoelastic composition in the amounts shown in Table 3 per 100 parts of the acrylate viscoelastic material (phr). Examples 10–14 had varying amounts of a rosin ester tackifier (Floral™85 available from Hercules, Inc., of Wilmington, Del.). Example 15 included dioctyl phthalate, a plasticizer. Examples 16–18 included diisononyl phthalate (Jayflex™ diisononyl phthalate available from Exxon Chemical Co.). Examples 19–21 included both tackifier (Foral™85) and a plasticizer (diisononyl phthalate). Examples 22–23 included a hydroabietyl resin tackifier (Abitol™E available from Hercules, Inc.)

TABLE 3

| Ex | Tack phr | Plas phr | Tg C. | Ea kcal/mol | Coat Weight g/155 cm² | Runout Time Temp C. | Runout Time Days |
|----|----------|----------|-------|-------------|----------------------|---------------------|------------------|
| 9  | 0    | 0  | −42.1 | 16.8 | 0.37 | 20.5 | >481* |
| 10 | 25   | 0  | −29.3 | 22.8 | 0.37 | 20.5 | >550* |
| 11 | 50   | 0  | −23.2 | 24   | 0.44 | 20.5 | >481* |
| 12 | 55.6 | 0  | −21.3 | 23.7 | 0.40 | 20.5 | >481* |
| 13 | 75   | 0  | −15.7 | 23.9 | 0.46 | 22.4 | >369* |
| 14 | 100  | 0  | −9.2  | 25.6 | 0.51 | 22.4 | >369* |
| 15 | 0    | 10 | —     | 17.3 | 0.51 | 20.5 | >196* |
| 16 | 0    | 20 | —     | 19.4 | 0.53 | 22.4 | 112   |
| 17 | 0    | 30 | —     | 19.2 | 0.57 | 22.4 | 30    |
| 18 | 0    | 15 | −53.7 | 16   | 0.40 | 22.4 | 117   |
| 19 | 50   | 15 | −36.2 | 24.6 | 0.40 | 20.5 | 50    |
| 20 | 55.6 | 15 | —     | 19.5 | 0.57 | 20.5 | 19    |
| 21 | 50   | 30 | −43   | 20   | 0.50 | 22.4 | 16    |
| 22 | 50   | 0  | −36.4 | 21.3 | 0.35 | 22.4 | 32    |
| 23 | 100  | 0  | −31.1 | 23.9 | 0.34 | 22.4 | 12    |

*Runout not yet achieved at time data was recorded, example was still running.

The data in Table 3 show how varying amounts of plasticizers and/or tackifiers can be added to a viscoelastic material to modify the glass transition temperature, the activation energy, and the runout time of an indicator.

EXAMPLES 24–25

Time temperature indicators were prepared as in Example 1 except that Example 24 used a viscoelastic material which had a composition, by weight, of 50 parts ethyl acrylate and 50 parts methyl acrylate, and Example 25 used a viscoelastic material which had a composition, by weight, of 18 parts ethyl acrylate and 82 parts methyl acrylate. The solvent used for these examples was a 90/10 mixture of ethyl acetate/isopropanol. Test results are shown in Table 4.

EXAMPLES 26–27

Time temperature indicators were prepared as in Example 1 except that Example 26 used a viscoelastic material which had a composition of 60 parts isooctyl acrylate and 40 parts isobornyl acrylate, and Example 27 used a viscoelastic material which had a composition of 53 parts isooctyl acrylate and 47 parts isobornyl acrylate. The solvent used for these examples was a 99/1 blend of ethyl acetate/isopropanol. Test results are shown in Table 4.

TABLE 4

| Ex | Tg C. | Ea kcal/mol | **Inherent Viscosity | Coat Weight g/155 cm² | Runout Time - Days at 22.4° C. |
|----|-------|-------------|----------------------|----------------------|-------------------------------|
| 24 | −8.7  | 13 | 0.84 | 0.51  | >349* |
| 25 | −0.9  | —  | 0.79 | 0.56  | >349* |
| 26 | −15.3 | 21 | 0.81 | 0.37  | >349* |
| 27 | −10.7 | 20 | 0.75 | .036  | >349* |

*Runout not yet achieved at time data was recorded, example was still running.
**Concentration was 0.5 g/dl.

EXAMPLE 28

A pressure sensitive adhesive composition was prepared by compounding 100 parts of a styrene-isoprene-styrene block copolymer (Kraton™1107 available form Shell Chemical Co.), 100 parts hydrocarbon tackifying resin (Wingtack™Extra available from The Goodyear Company) and 100 parts of tackifying resin (Zonarez™A25 available from Arizona Chemical Co.) in 400 parts of toluene. Also added were antioxidants (1.5 parts Irganox™1076 available from Ciba Geigy, and 1.5 parts Cyanox™LTDP available from American Cyanamid Co.). The adhesive composition was coated to a dry coating thickness of 30.5 micrometers onto a transparent corona treated biaxially oriented polypropylene film to form a second laminate. A time temperature indicator was then prepared by laminating a 2.54 cm wide strip of the second laminate with a 2.3 kg roller to samples of the first laminate which had been printed with black UPC bar codes. The indicators were then measured for Color 'L' values and the bar code was scanned for readability with a Quick-Check™ bar code reader with a 633 wand (available from Photographic Sciences Corp., Webster, N.Y.). The samples were then aged and monitored at 23.9° C. and 48.9° C. The bar code was no longer readable by the bar code reader when the Color 'L' value dropped below about 58. Test results are shown in Table 5.

TABLE 5

| Time - Days | Color 'L'Value 23.9C | Color 'L'Value 48.9C |
|-------------|----------------------|----------------------|
| 0   | 67    | 67    |
| 1   | 67    | 63.5  |
| 5   | 66    | 56*   |
| 7   | 65.5  | 52.5  |
| 14  | 65    | 45.5  |
| 33  | 62    | 29.5  |
| 47  | 61.3  | 27.6  |
| 71  | 58.3  | 21.3  |
| 138 | 48.6* | 18.4  |

*Time at which the bar code was no longer readable by the scanner.

The data in Table 5 show that a time temperature indicator of the invention provides an indication of an exposure to higher temperatures by darkening more rapidly than if the indicator were are a lower temperature.

EXAMPLES 28–30

For Example 28, a time temperature indicator was prepared by laminating the second laminate of Example 19 to First Laminate D. Examples 29 and 30 were prepared by laminating the second laminate of Example 28 to First Laminates B and C, respectively. Examples 28–30 were not monitored for specific runout times, but a visually observable color change was observed to occur over a period of time.

EXAMPLES 31–40

Examples 31–40 were fabricated with the porous matrix comprising samples of 0.007 inch thick washed microporous polyethylene film. Examples 31–35 included viscoelastic materials prepared by copolymerizing varying ratios of isooctyl acrylate (IOA) and acrylic acid (AA) as set forth in Table 6. Examples 36–40 were prepared by copolymerizing varying ratios of isooctyl acrylate (IOA) and methyl acrylate (MA) as set forth in Table 7. The viscoelastic materials were prepared in solutions of varying blends of ethyl acetate/ isopropanol (EtOAc/iPrOH) solvent with varying percent solids as set forth in Tables 6 and 7. The solutions were poured into aluminum drying pans of approximately 5.0 cm (2.0 in) diameter and allowed to air dry for approximately 16 hours, and then were placed in a convection oven at 120° C. oven for 7 hours. The samples were then placed in a vacuum oven at 80° C. for 16.5 hours. The adhesive compositions had a dry coating thickness of approximately 1 min. Samples of the microporous polyethylene film were placed on the exposed surface of each viscoelastic material sample. The drying pans were cut in half, with one set being stored at 22° C. (72° F.), and the other set being stored at 49° C. (120° F.). To determine the runout time in Examples 31–49, the samples were monitored periodically to visually determine when the porous film become translucent enough to view the aluminum pan through the polyethylene film and the viscoelastic material. The results are presented in Tables 6 and 7

TABLE 6

| Ex | IOA/AA | EtOAc/ iPrOH | % solids | Inherent Viscosity | Runout Time 22° C. | Runout Time 49° C. |
|---|---|---|---|---|---|---|
| 31 | 90/10 | 95/5 | 55.8 | 0.79 | >170* | >170* |
| 32 | 90/10 | 84/16 | 54.2 | 0.41 | >170* | 14 |
| 33 | 94/6 | 92/8 | 54.7 | 0.58 | >170* | >170* |
| 34 | 98/2 | 97/3 | 55.7 | 0.82 | >170* | 30 |
| 35 | 98/2 | 89/11 | 54.4 | 0.42 | 4 | 1 |

*Runout not yet achieved at time data was recorded, example was still running.

TABLE 7

| Ex | IOA/MA | EtOAc/ iPrOH | % solids | Inherent Viscosity | Runout Time 22° C. | Runout Time 49° C. |
|---|---|---|---|---|---|---|
| 36 | 80/20 | 94/6 | 54.3 | 0.74 | 14 | 1.3 |
| 37 | 80/20 | 80/20 | 53.8 | 0.36 | 1.3 | 1 |
| 38 | 96/4 | 96.8/3.2 | 54.2 | 0.80 | 49 | 6 |
| 39 | 96/4 | 90/10 | 53.9 | 0.44 | 4 | 1 |
| 40 | 88/12 | 93.5/6.5 | 53.9 | 0.66 | 12 | 4 |

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A time and temperature integrating device for providing a visually observable indication of cumulative thermal exposure, said device comprising:

a) a first substrate comprising a first side and a second side, said second side including a diffusely light-reflective porous matrix, wherein said porous matrix includes an exposed surface;

b) a first backing comprising a first surface and a second surface, wherein said first surface of said backing includes a viscoelastic material disposed thereon, and wherein said viscoelastic material includes an exposed surface; and c) actuating means for selectively switching said device from an unactivated state to an activated state;

wherein when said device is in said unactivated state, said viscoelastic material is substantially out of contact with said porous matrix;

wherein when said device is in said activated state, said actuating means maintains said exposed surface of said viscoelastic material and said exposed surface of said porous matrix in substantial contact with one another such that said viscoelastic material progressively migrates into said porous matrix at a rate which increases with increasing temperature; and wherein migration of said viscoelastic material into said porous matrix progressively increases the light transmissivity of said porous matrix to provide said visually observable indication of cumulative thermal exposure.

2. The device of claim 1, wherein said viscoelastic material comprises a pressure sensitive adhesive.

3. The device of claim 2, wherein said pressure sensitive adhesive bonds itself to said porous matrix in response to engaging said actuating means.

4. The device of claim 1, wherein said visually observable indication comprises latent indicia, wherein said latent indicia is not visually observable when said indicator is in its unactivated state, and wherein migration of said viscoelastic material into said porous matrix sufficiently increases the light transmissivity of said porous matrix such that said latent indicia becomes visually observable.

5. The device of claim 4, wherein said latent indicia comprises a bar code which is not readable by a bar code reader when said indicator is in its unactivated state, and wherein migration of said viscoelastic material into said porous matrix renders said porous matrix sufficiently light transmissive to allow a bar code reader to read said bar code.

6. The device of claim 4, wherein said latent indicia is disposed on at least one of said first side of said substrate, said second side of said substrate, said exposed surface of said porous matrix, and said exposed surface of said viscoelastic material.

7. The device of claim 6, wherein said latent image comprises a repellent disposed on a first portion of at least one of said exposed surface of said porous matrix and said exposed surface of said viscoelastic material to attenuate migration of said viscoelastic material into said porous matrix at said first portion, and wherein migration of said viscoelastic material at a second portion of said porous matrix sufficiently increases the light transmissivity of said second portion of said porous matrix such that said substrate becomes visible through said porous matrix at said second portion.

8. The device of claim 4, further comprising a second substrate disposed on said first side of said first substrate, said second substrate including said latent indicia, wherein said first substrate is light transmissive.

9. The device of claim 4, further comprising a comparison image, wherein said visually observable indication comprises said latent indicia having a density substantially the same as or greater than the density of said comparison image when said viscoelastic material migrates into said porous matrix.

10. The device of claim 4, further comprising a plurality of comparison images of increasing density, wherein said visually observable indication comprises said latent indicia having a density substantially the same as or greater than the density of one of said plurality of comparison images when said viscous material migrates into said porous matrix.

11. The device of claim 4, wherein at least one of said porous matrix and said viscoelastic material is applied in a pattern, and wherein said pattern comprises said latent indicia.

12. The device of claim 1, wherein said visually observable indication comprises obscurable indicia, wherein said second surface of said substrate comprises a color and optical density sufficiently similar to the color and optical density of said obscurable indicia such that migration of said viscoelastic material into said porous matrix sufficiently increases the light transmissivity of said porous matrix such that said second surface of said substrate becomes progressively visible through said porous matrix and thereby progressively reduces the contrast between said obscurable indicia and said substrate to thereby obscure said obscurable indicia.

13. The device of claim 12, wherein said obscurable indicia comprises a bar code, wherein said bar code is readable by a bar code reader when said porous matrix is opaque, and wherein migration of said viscoelastic material into said porous matrix sufficiently increases the light transmissivity of said porous matrix such that said bar code becomes sufficiently obscured so as not to be readable by a bar code reader.

14. The device of claim 12, wherein said obscurable indicia is disposed on at least one of said exposed surface of said porous matrix, said exposed surface of said viscoelastic material, said first surface of said backing, and said second surface of said backing.

15. The device of claim 14, wherein said obscurable indicia comprises a permanently transparentized portion of said porous matrix.

16. The device of claim 12, further comprising a second backing disposed over said first backing, and wherein said obscurable indicia is disposed on said second backing.

17. The device of claim 4, wherein said visually observable indication further comprises obscurable indicia, wherein said second surface of said substrate comprises a color and optical density sufficiently similar to the color and optical density of said obscurable indicia such that migration of said viscoelastic material into said porous matrix sufficiently increases the light transmissivity of said porous matrix such that said second surface of said substrate becomes progressively visible through said porous matrix and thereby progressively reduces the contrast between said obscurable indicia and said substrate to thereby obscure said obscurable indicia.

18. The device of claim 17, wherein said latent indicia comprises a first bar code which is not readable by a bar code reader when said indicator is in its unactivated state, wherein said obscurable indicia comprises a second bar code readable by a bar code reader; and
wherein migration of said viscoelastic material into said porous matrix sufficiently increases the light transmissivity of said porous matrix so as to: (a) allow a bar code reader to read said first bar code, and (b) sufficiently obscure said second bar code so as not to be readable by a bar code reader.

19. The device of claim 4, wherein the optical density of said latent indicia increases by at least 0.2 as the light transmissivity of said porous matrix increases.

20. The device of claim 12 wherein the difference between the optical density of said obscurable indicia and the optical density of said substrate decreases by at least 0.2 as the light transmissivity of said porous matrix increases.

21. The device of claim 1, wherein said porous matrix comprises a plurality of particles held to said substrate in an open pore manner by a binder.

22. The device of claim 21, wherein the index of refraction of said particles is sufficiently close to the index of refraction of said viscoelastic material such that said porous matrix is rendered sufficiently light transmissive to provide said visually observable indication when said viscoelastic material migrates into said porous matrix.

23. The device of claim 22, wherein the index of refraction of said viscoelastic material is from 1.3 to 2.2 and the index of refraction of said particles is from 1.3 to 2.2.

24. The device of claim 22, wherein said index of refraction of said viscoelastic material is within 0.4 of the index of refraction of said particles.

25. The device of claim 1, wherein said viscoelastic material has an effective activation energy selected such that said device indicates a predetermined allowable cumulative thermal exposure.

26. The device of claim 25, wherein said effective activation energy is selected such that said device indicates a predetermined allowable cumulative thermal exposure for an object whose cumulative thermal exposure is to be indicated by said device.

27. The device of claim 26 in combination with an object whose cumulative thermal exposure is to be indicated by said device, wherein said device is thermally coupled with said object.

28. The device of claim 25, wherein said viscoelastic material has an effective activation energy of from 5 to 70 kilocalories per mole.

29. The device of claim 25, wherein said viscoelastic material has an effective activation energy of from 8 to 40 kilocalories per mole.

30. The device of claim 25, wherein said viscoelastic material has an effective activation energy of from 12 to 30 kilocalories per mole.

31. The device of claim 25, wherein said viscoelastic material has an effective activation energy of at least 30 kilocalories per mole.

32. The device of claim 1, wherein said porous matrix comprises a microporous polymeric film.

33. The device of claim 1, wherein said viscoelastic material comprises a viscoelastic liquid state at 50° C.

34. The device of claim 33, wherein said viscoelastic material comprises a viscoelastic liquid state at 20° C.

35. The device of claim 34, wherein said viscoelastic material comprises a viscoelastic liquid state at 0° C.

36. The device of claim 35, wherein said viscoelastic material comprises a viscoelastic liquid state at −45° C.

37. The device of claim 27, wherein said viscoelastic material comprises a viscoelastic liquid state throughout the temperature range at which appreciable change in the object to be monitored occurs.

38. The device of claim 1, wherein said viscoelastic material comprises a viscoelastic liquid state at the time said actuating means switches said indicator to said activated state.

39. The device of claim 1, further comprising a plurality of said viscoelastic materials, wherein each of said viscoelastic materials indicates a respective predetermined allowable cumulative thermal exposure.

40. The device of claim 1, further comprising a plurality of said porous matrices, wherein each of said porous matrices indicates a respective predetermined allowable cumulative thermal exposure.

41. The device of claim 2, wherein said pressure sensitive adhesive is selected from the group consisting essentially of polyisoprene based adhesive, atactic polypropylene based adhesive, polybutadiene based adhesive, polyisobutylene based adhesive, silicone based adhesive, ethylene vinyl acetate based adhesive, and acrylate based adhesive, and mixtures thereof.

42. The device of claim 2, wherein said pressure sensitive adhesive is selected from the group consisting essentially of isooctyl acrylate based adhesive, isooctyl acrylate/acrylic acid based adhesive, isooctyl acrylate methacrylate based adhesive, ethyl acrylate/methyl acrylate based adhesive, and isooctyl acrylate/isobornyl acrylate based adhesive, and mixtures thereof.

43. The device of claim 2, wherein said pressure sensitive adhesive comprises an isooctyl acrylate/acrylic acid based adhesive having an isooctyl acrylate/acrylic acid weight ratio of from about 80/20 to 98/2.

44. The device of claim 42, wherein said isooctyl acrylate/acrylic acid based adhesive has an isooctyl acrylate/acrylic acid weight ratio of from about 90/10 to 94/6.

45. The device of claim 2, wherein said pressure sensitive adhesive further comprises a tackifier in a tackifier to adhesive base weight ratio of up to 2:1.

46. The device of claim 45, wherein said tackifier comprises a hydrogenated rosin ester.

47. The device of claim 2, wherein said pressure sensitive adhesive further comprises a plasticizer in a plasticizer to adhesive base weight ratio of up to 2:1.

48. The device of claim 47, wherein said plasticizer is selected from the group consisting essentially of mineral oil, hydrocarbon oil, alkyl phthalates, and allyl phthalates.

49. The device of claim 21, wherein said particles are selected from the group consisting essentially of aluminum oxide, hydrated aluminum oxide, glass, silica, silane-treated silica, silicon dioxide, rice starch, titanium dioxide, zinc oxide, calcium fluoride, and calcium carbonate.

50. The device of claim 21, wherein said particles have an average diameter of from 0.01 to 750 micrometers.

51. The device of claim 50, wherein said particles have an average diameter of from 0.5 to 40 micrometers.

52. The device of claim 51, wherein said particles have an average diameter of about 8 micrometers.

53. The device of claim 21, wherein said binder is selected from the group consisting essentially of acrylic binder, epoxy binder, polyurethane binder, and thermoset alkyd binder.

54. The device of claim 21, wherein said porous matrix comprises a binder to particle volume ratio in the range of about 1:20 to 2:3.

55. The device of claim 54, wherein said porous matrix comprises a binder to particle volume ratio in the range of about 1:5 to 1:2.

56. The device of claim 1, wherein said viscoelastic material has a migration rate into said porous matrix which increases a predetermined amount with increasing temperature such that said device indicates a predetermined allowable cumulative thermal exposure.

57. The device of claim 1, wherein said actuating means comprises a spacer having a top surface, a bottom surface opposite said top surface, and an opening therethrough, wherein said first substrate is disposed on said bottom surface with said exposed surface of said porous matrix at least partially overlying said opening, said first backing is disposed on said top surface with exposed surface of said viscoelastic material at least partially overlying said opening and said porous matrix, wherein said spacer maintains said viscoelastic material substantially out of contact with said porous matrix when said indicator is in said unactivated state, and wherein said viscoelastic material and said porous matrix substantially contact one another through said opening when said indicator is in said activated state.

58. The device of claim 1, wherein said actuating means comprises a barrier film having a first portion at least partially overlying said exposed surface of said viscoelastic material and a second portion at least partially overlying said exposed surface of porous matrix for maintaining said viscoelastic material substantially out of contact with said porous matrix when said indicator is in said unactivated state, and wherein said barrier film may be removed from said indicator for allowing said viscous material and said porous matrix to contact one another when said indicator is in said activated state.

59. The indicator of claim 58 in combination with a container, wherein:

said container comprises a first member and a second member;

said first substrate is mounted on one of said first member and said second member; and said barrier film is operatively attached to the other of said first member and said second member, such that upon separating said first and second members, said barrier film is removed from said indicator thereby switching said indicator to its activated state.

60. The device of claim 1, wherein said actuating means comprises a plurality of proximate portions and a plurality of remote portions formed in at least one of said first substrate and said first backing, wherein when said indicator is in said unactivated state, said exposed surface of said porous matrix and said exposed surface of said viscoelastic material contact one another at said proximate portions, and said remote portions maintain said viscoelastic material and said porous matrix substantially out of contact at said remote portions, and wherein said remote portions may be deformed to contact said viscoelastic material and said porous matrix with one another at said plurality of remote portions when said indicator is in said activated state.

61. The device of claim 1, wherein said actuating means comprises an actuating substrate having a first portion and a second portion, wherein said first substrate is disposed on said first portion with said exposed surface of said porous matrix opposite said actuating substrate, wherein said first backing is disposed on said second portion with said exposed surface of said viscoelastic material opposite said actuating substrate, wherein when said indicator is in said unactivated state, said activating substrate maintains said viscoelastic material substantially out of contact with said porous matrix, and wherein said indicator may be switched to said activated state by folding said activating substrate in such a manner and degree as to bring said viscoelastic material and said porous matrix into substantial contact with one another.

62. The device of claim 1, wherein said actuating means comprises a plurality of spacing bodies disposed between said exposed surface of said porous matrix and said exposed surface of said viscoelastic material to maintain said viscoelastic material out of contact with said porous matrix when said indicator is in said unactivated state, and wherein when said indicator is in said activated state, said viscoelastic material and said porous matrix are maintained in substantial contact with one another between said spacing bodies.

63. The device of claim 1, wherein said actuating means comprises a transparent cover overlying said first backing and said first substrate, said cover including a shallowly curved, exteriorly convex dome having an inner surface, extending in an unactivated position of stability away from said first backing and said first substrate when said indicator is in said unactivated state;

wherein said cover has a profile selected to permit a snap movement of said cover from said unactivated position to an activated position upon the application of force to said cover, thereby forcing said cover to curve towards said first backing and said first substrate and force said viscoelastic material into pressure contact with said porous matrix to switch said indicator to said activated state.

64. The device of claim 1, further comprising mounting means for mounting said indicator to an object whose cumulative thermal exposure is to be indicated.

65. The device of claim 64, wherein said mounting means comprises a pressure sensitive adhesive.

66. A time and temperature integrating device for providing a visually observable indication of cumulative thermal exposure, said device comprising:

a) a first substrate comprising a first side and a second side, said second side including a diffusely light-reflective porous matrix, wherein said porous matrix includes an exposed surface;

b) a first backing comprising a first surface and a second surface, wherein said first surface of said backing includes a viscoelastic material disposed thereon, wherein said viscoelastic material includes an exposed surface; and c) actuating means for selectively switching said device from an unactivated state to an activated state;

wherein when said device is in said unactivated state, said viscoelastic material is substantially out of contact with said porous matrix;

wherein when said device is in said activated state, said actuating means maintains said exposed surface of said viscoelastic material and said exposed surface of said porous matrix in substantial contact with one another such that said viscoelastic material progressively migrates into said porous matrix at a rate which increases with increasing temperature;

wherein migration of said viscoelastic material into said porous matrix progressively decreases the light transmissivity of said porous matrix to provide said visually observable indication of cumulative thermal exposure.

67. A time and temperature integrating device for providing a visually observable indication of cumulative thermal exposure, said device comprising:

a) a first substrate comprising a first side and a second side, said second side including a diffusely light-reflective porous matrix, wherein said porous matrix includes an exposed surface;

b) a first backing comprising a first surface and a second surface, wherein said first surface of said backing includes a pressure sensitive adhesive disposed thereon, said pressure sensitive adhesive including at least one of a tackifier and a plasticizer as a component thereof, and wherein said pressure sensitive adhesive includes an exposed surface; and c) actuating means for selectively switching said device from an unactivated state to an activated state;

wherein when said device is in said unactivated state, said pressure sensitive adhesive is substantially out of contact with said porous matrix;

wherein when said device is in said activated state, said actuating means maintains said exposed surface of said pressure sensitive adhesive and said exposed surface of said porous matrix in substantial contact with one another such that all of the components of said pressure sensitive adhesive together progressively migrate into said porous matrix at a rate which increases with increasing temperature;

wherein migration of said pressure sensitive adhesive into said porous matrix progressively increases the light transmissivity of said porous matrix to provide said visually observable indication of cumulative thermal exposure.

68. A time and temperature integrating device for providing a visually observable indication of cumulative thermal exposure, said device comprising:

a) a diffusely light-reflective porous matrix having an exposed surface;

b) a first backing comprising a first surface and a second surface, wherein said first surface of said backing includes a viscoelastic material disposed thereon, and wherein said viscoelastic material includes an exposed surface; and c) actuating means for selectively switching said device from an unactivated state to an activated state;

wherein when said device is in said unactivated state, said viscoelastic material is substantially out of contact with said porous matrix;

wherein when said device is in said activated state, said actuating means maintains said exposed surface of said viscoelastic material and said exposed surface of said porous matrix in substantial contact with one another such that said viscoelastic material progressively migrates into said porous matrix at a rate which increases with increasing temperature; and wherein migration of said viscoelastic material into said porous matrix progressively increases the light transmissivity of said porous matrix to provide said visually observable indication of cumulative thermal exposure.

69. A method for providing a time and temperature integrating device for providing a visually observable indication of cumulative thermal exposure of an object, comprising the steps of:

a) mounting a first substrate onto the object, said substrate comprising a first side and a second side, said second side including a diffusely light-reflective porous matrix; and b) contacting a first surface of a first backing against said porous matrix, wherein said first surface of said backing includes a viscoelastic material disposed thereon;

wherein said viscoelastic material progressively migrates into said porous matrix at a rate which increases with increasing temperature; and wherein migration of said viscoelastic material into said porous matrix progressively changes the light transmissivity of said porous matrix to provide said visually observable indication.

70. The method of claim 69, wherein step a) precedes step b).

71. The method of claim 69, wherein step b) precedes step a).

72. The method of claim 69, wherein step a) is performed simultaneously with step b).

73. A method for providing a visually observable indication of cumulative thermal exposure, comprising the steps of:

a) applying a viscoelastic liquid onto an exposed surface of a diffusely light-reflective porous matrix; wherein said viscoelastic liquid progressively migrates into said porous matrix at a rate which increases with increasing temperature;

b) exposing said viscoelastic liquid to a time and temperature profile; and c) migrating said viscoelastic liquid into said porous matrix in response to said time and temperature profile to thereby change the light transmissivity of said porous matrix to provide a visually observable indication of cumulative thermal exposure.

74. A method for providing a visually observable indication of cumulative thermal exposure of an object, comprising the steps of:

a) mounting a first substrate onto the object, said substrate comprising a first side and a second side, said second side including a diffusely light-reflective porous matrix;

b) contacting a first surface of a first backing against said porous matrix, wherein said first surface of said backing includes a viscoelastic material disposed thereon, wherein said viscoelastic material progressively migrates into said porous matrix at a rate which increases with increasing temperature;

c) exposing said object to a time and temperature profile; and d) migrating said viscoelastic material into said porous matrix in response to said time and temperature profile to thereby change the light transmissivity of said porous matrix to provide a visually observable indication of cumulative thermal exposure.

75. The method of claim 74, wherein step a) precedes step b).

76. The method of claim 74, wherein step b) precedes step a).

77. The method of claim 74, wherein step a) is performed simultaneously with step b).

78. A method for providing a time and temperature integrating device for providing a visually observable indication of cumulative thermal exposure, comprising the steps of:

a) forming an opening in a generally planar spacer, said spacer comprising a top side and a bottom side;

b) applying an adhesive to at least said bottom side of the spacer;

c) adhering a first substrate onto said bottom side of the spacer to at least partially overlay said opening, said first substrate comprising a diffusely light-reflective porous matrix overlaying said opening; and d) applying a first surface of a first backing to said spacer to at least partially overlay said opening and said porous matrix, wherein said first surface of said backing includes a viscoelastic material disposed thereon overlaying said opening;

wherein said viscoelastic material progressively migrates into said porous matrix at a rate which increases with increasing temperature to thereby integrate said temperature over time; and wherein migration of said viscoelastic material into said porous matrix progressively changes the light transmissivity of said porous matrix to provide said visually observable indication.

* * * * *

UNITED STATES PATENT AND TRADEMARK OFFICE
CERTIFICATE OF CORRECTION

PATENT NO.    : 5,667,303
DATED         : September 16, 1997
INVENTOR(S)   : Robert P. Arens, et al.

It is certified that error appears in the above-identified patent and that said Letters Patent is hereby corrected as shown below:

Column 33,
Line 6, "viscous" should read --viscoelastic--.

Signed and Sealed this

Third Day of July, 2001

Attest:

NICHOLAS P. GODICI
Attesting Officer
Acting Director of the United States Patent and Trademark Office